US009727452B2

(12) United States Patent
Karamcheti et al.

(10) Patent No.: US 9,727,452 B2
(45) Date of Patent: Aug. 8, 2017

(54) DISTRIBUTING METADATA ACROSS MULTIPLE DIFFERENT DISRUPTION REGIONS WITHIN AN ASYMMETRIC MEMORY SYSTEM

(75) Inventors: Vijay Karamcheti, Los Altos, CA (US); Ashish Singhai, Cupertino, CA (US)

(73) Assignee: Virident Systems, LLC, San Jose, CA (US)

( * ) Notice: Subject to any disclaimer, the term of this patent is extended or adjusted under 35 U.S.C. 154(b) by 1161 days.

(21) Appl. No.: 12/335,499

(22) Filed: Dec. 15, 2008

(65) Prior Publication Data

US 2009/0157989 A1    Jun. 18, 2009

Related U.S. Application Data

(60) Provisional application No. 61/013,976, filed on Dec. 14, 2007.

(51) Int. Cl.
*G06F 12/02* (2006.01)

(52) U.S. Cl.
CPC .. *G06F 12/0246* (2013.01); *G06F 2212/1032* (2013.01); *G06F 2212/7207* (2013.01); *G06F 2212/7208* (2013.01)

(58) Field of Classification Search
CPC ............... G06F 12/00–12/16; G06F 2212/72–2212/7211
USPC ........................ 711/103, 156, 173
See application file for complete search history.

(56) References Cited

U.S. PATENT DOCUMENTS

| 5,148,527 | A  | * | 9/1992  | Basso ............... G06F 9/544 710/305 |
| 5,579,502 | A  | * | 11/1996 | Konishi et al. ............... 711/103 |
| 5,732,017 | A  | * | 3/1998  | Schumann et al. ...... 365/185.11 |
| 5,897,661 | A  | * | 4/1999  | Baranovsky et al. ........ 711/170 |
| 6,405,284 | B1 | * | 6/2002  | Bridge ....................... 711/114 |
| 6,889,214 | B1 | * | 5/2005  | Pagel et al. ................. 705/410 |
| 6,925,476 | B1 | * | 8/2005  | Multer et al. |
| 2001/0048613 | A1 | * | 12/2001 | Al-Shamma et al. ... 365/185.19 |
| 2002/0196669 | A1 | * | 12/2002 | Hsu et al. ............... 365/189.04 |
| 2003/0023811 | A1 | * | 1/2003  | Kim et al. .................. 711/114 |

(Continued)

OTHER PUBLICATIONS

International Search Report and Written Opinion for PCT Application No. PCT/US2008/086887, dated Feb. 5, 2009, 13 pages.

*Primary Examiner* — Nicholas Simonetti
(74) *Attorney, Agent, or Firm* — Patterson & Sheridan, LLP

(57) ABSTRACT

Metadata that corresponds to application data is distributed across different disruption regions of an asymmetric memory component such that metadata is written in the same disruption region as the application data to which it corresponds. A first block of application data is written to a first disruption region and a second block of application data is written to a second disruption region. A first block of metadata corresponding to the first block of application data and a second block of metadata corresponding to the second block of application data both are generated. The first block of metadata is written to the first disruption region and the second block of metadata is written to the second disruption region such that the first and second blocks of metadata are written to the same disruption regions as the blocks of application data to which they correspond.

26 Claims, 13 Drawing Sheets

(56) References Cited

U.S. PATENT DOCUMENTS

| | | | |
|---|---|---|---|
| 2003/0214861 A1* | 11/2003 | Takano et al. | 365/200 |
| 2003/0227800 A1* | 12/2003 | Saito | G11C 8/12 |
| | | | 365/200 |
| 2003/0237019 A1* | 12/2003 | Kleiman et al. | 714/6 |
| 2004/0027856 A1* | 2/2004 | Lee et al. | 365/185.11 |
| 2004/0044873 A1* | 3/2004 | Wong et al. | 711/218 |
| 2004/0059822 A1* | 3/2004 | Jiang et al. | 709/230 |
| 2004/0162954 A1* | 8/2004 | Chauvel | G06F 9/541 |
| | | | 711/155 |
| 2004/0223729 A1* | 11/2004 | Okuno et al. | 386/46 |
| 2004/0240301 A1* | 12/2004 | Rao | 365/230.03 |
| 2005/0050518 A1 | 3/2005 | Adolph et al. | |
| 2006/0047932 A1* | 3/2006 | Anderson et al. | 711/162 |
| 2006/0224843 A1 | 10/2006 | Rao et al. | |
| 2006/0288156 A1 | 12/2006 | Fish et al. | |
| 2007/0150689 A1* | 6/2007 | Pandit et al. | 711/170 |
| 2008/0229045 A1* | 9/2008 | Qi | 711/170 |
| 2008/0288712 A1* | 11/2008 | Cornwell et al. | 711/103 |

\* cited by examiner

700

```
Name: Volume 4

Size: 100 logical eraseblocks

Creation Date:  Date 1

Extension Date:  Date 2
```

Maintain, in a Volatile Memory Component, a Volume Information Table that Maps Individual Logical Blocks of a Logical Volume to the Individual Physical Data Blocks of an Asymmetric Memory Component that Store the Data Associated with Individual Logical Blocks of the Logical Volume (1010)

Determine that the Volume Information Table Needs to be Recreated (1015)

Access Metadata Stored in Metadata Blocks that are Distributed Across Different Banks of the Asymmetric Memory Component (1020)

For Each of the Individual Logical Blocks of the Logical Volume, Determine Which Physical Data Block that the Metadata Identifies as Corresponding to the Individual Logical Block and Storing Data Associated with the Individual Logical Block was Written to Most Recently (1025)

For Each of the Individual Logical Blocks of the Logical Volume, Configuring the Volume Information Table to Map the Individual Logical Block of the Logical Volume to the Particular Physical Data Block that the Metadata Identifies as Corresponding to the Individual Logical Block and Storing Data Associated with the Individual Logical Block that was Determined to Have Been Written to Most Recently (1030)

DISTRIBUTING METADATA ACROSS MULTIPLE DIFFERENT DISRUPTION REGIONS WITHIN AN ASYMMETRIC MEMORY SYSTEM

CROSS-REFERENCE TO RELATED APPLICATION

The present application claims priority from U.S. Provisional Patent Application Ser. No. 61/013,976, filed Dec. 14, 2007, and entitled "Distributing Metadata Across an Asymmetric Memory System," which is incorporated herein by reference in its entirety.

TECHNICAL FIELD

This disclosure relates to distributing metadata across an asymmetric memory system.

BACKGROUND

Memory systems store data to be used by computers or other electronic devices. Various different memory systems may be used and accessed by computers or other electronic devices. For example, computers may use and access main memory as well as secondary storage such as, for example, hard disks and/or removable storage.

Main memory is memory that is accessible to a central processing unit (CPU) of a computer or electronic device. Main memory is used to store data that is deemed likely to be actively used by the CPU. The CPU may access data within the main memory that is identified by using virtual addresses to map to corresponding physical addresses associated with the main memory. Main memory generally is volatile. Therefore, data stored in main memory generally is lost when the device is powered down.

Secondary storage generally is memory that is not directly accessible by a CPU of a computer or electronic device. Because secondary storage generally is not directly accessible by the CPU, the CPU may use input/output (I/O) channels to access secondary storage. In addition, the CPU may use intermediate areas in primary storage to effect data transfers between the CPU and secondary storage. Secondary storage generally is non-volatile. Therefore, data stored in secondary memory generally is not lost when the device is powered down.

SUMMARY

In one general aspect, an asymmetric memory unit includes disruption regions that have physical blocks that are configured such that writing to a disruption region of the asymmetric memory component affects the availability of other physical blocks within the same disruption region of the asymmetric memory component. Metadata that corresponds to application data for a file system is distributed across multiple different disruption regions of the asymmetric memory component such that metadata is written in the same disruption region of the asymmetric memory component as the application data to which the metadata corresponds. A first block of application data that corresponds to a first logical block of the file system is written to a first disruption region of the asymmetric memory component and a second block of application data that corresponds to a second logical block of the file system and that is different than the first block of application data is written to a second disruption region of the asymmetric memory component that is different than the first disruption region of the asymmetric memory component. A first block of metadata that corresponds to the first block of application data and that identifies the first block of application data as corresponding to the first logical block of the file system and a second block of metadata that corresponds to the second block of application data and that identifies the second block of application data as corresponding to the second logical block of the file system both are generated. Then, the first block of metadata is written to the first disruption region of the asymmetric memory component and the second block of metadata is written to the second disruption region of the asymmetric memory component such that the first and second blocks of metadata are written to the same disruption regions of the asymmetric memory component as the blocks of application data to which they correspond.

In another general aspect, a memory storage system includes an asymmetric memory component that has multiple disruption regions (e.g., banks of asymmetric memory) that include one or more physical blocks and that are configured such that writing to a physical block within a disruption region of the asymmetric memory component affects the availability of other physical blocks within the same disruption region of the asymmetric memory component. Metadata that is related to a write operation performed to write application data to an individual disruption region of the asymmetric memory component is written to the same individual disruption region of the asymmetric memory component as the application data. An instruction to write a first quantum of application data to the asymmetric memory component is processed, and, in response, a first write operation is performed. The first write operation includes generating metadata related to the first write operation, and writing the first quantum of application data and the metadata related to the first write operation to different physical blocks within a first disruption region of the asymmetric memory component such that the first quantum of application data and the metadata related to the first write operation both are written to the same disruption region of the asymmetric memory component. An instruction to write a second quantum of application data to the asymmetric memory component is processed, and, in response, a second write operation is performed. The second write operation includes generating metadata related to the second write operation, and writing the second quantum of application data and the metadata related to the second write operation to different physical blocks within a second disruption region of the asymmetric memory component that is different from the first disruption region of the asymmetric memory component, such that the second quantum of application data and the metadata related to the second write operation both are written to the same disruption region of the asymmetric memory component.

Implementations may include one or more of the following features. For example, generating metadata related to the first write operation may include determining that the first write operation includes writing the first quantum of application data to a particular physical block within the first disruption region of the asymmetric memory component. In such cases, writing the metadata related to the first write operation may include writing, to a different physical block within the first disruption region of the asymmetric memory component, metadata that identifies the particular physical block within the first disruption region of the asymmetric memory component as storing the first quantum of application data. In some implementations, generating metadata related to the first write operation may include determining a number of times that the particular physical block within the first disruption region of the asymmetric memory component has been erased, and writing the metadata related to the first write operation may include writing, to the different physical block within the first disruption region of the asymmetric memory component, metadata that specifies the number of times that the particular physical block within the first disruption region of the asymmetric memory component has been erased. Additionally or alternatively, generating the metadata related to the first write operation may include determining a relative time (e.g., a physical date and time) at which the first write operation occurs and writing the metadata related to the first write operation may include writing metadata that specifies the relative time at which the first write operation was determined to occur.

In some implementations, processing an instruction to write a first quantum of application data to the asymmetric memory component may include receiving an instruction to write the first quantum of application data to a particular logical block within a logical volume and converting the received instruction into an instruction to write the first quantum of application data to a particular physical block within the first disruption region of the asymmetric memory component. In such implementations, generating metadata related to the first write operation may include determining to which logical block within which logical volume the received instruction specified that the first quantum of application data was to be written, and writing the metadata related to the first write operation may include writing metadata that identifies the particular physical block within the first disruption region of the asymmetric memory component as corresponding to the particular logical block of the logical volume, and that identifies the particular physical block within the first disruption region of the asymmetric memory component as actually storing the first quantum of application data that the received instruction specified was to be written to the particular logical block within the logical volume.

A logical volume may be associated with a volume identifier and a particular logical block within the logical volume may be associated with a volume offset that identifies the particular logical block's offset within the logical volume. In such cases, receiving an instruction to write the first quantum of application data to a particular logical block within a logical volume may include receiving an instruction that specifies that the first quantum of application data is to be written to the particular logical block within the logical volume by specifying the volume identifier of the logical volume and the volume offset of the particular logical block. Writing the metadata related to the first write operation may include writing the volume identifier and the volume offset.

In some implementations, the memory storage system may include a volatile memory component that is different from the asymmetric memory component. A volume information table that maps logical blocks within a volume to corresponding physical blocks in the asymmetric memory component that store application data associated with the individual logical blocks to which they correspond may be maintained in the volatile memory component. The volume information table may be updated to identify a particular physical block within the first disruption region of the asymmetric memory component as corresponding to a particular logical block within the logical volume and to identify the particular physical block within the first disruption region of the asymmetric memory component as storing the first quantum of application data that a received instruction specified was to be written to the particular logical block within the logical volume. In addition, the volume information table may be updated to identify a particular physical block within the second disruption region of the asymmetric memory component as corresponding to an individual logical block within the logical volume and to identify the particular physical block within the second disruption region of the asymmetric memory component as storing a second quantum of application data.

At some point, it may be determined that the volume information table needs to be recreated. In response, the volume information table may be recreated by accessing metadata stored in at least two different disruption regions of the asymmetric memory component. For example, the metadata that identifies the particular physical block within the first disruption region of the asymmetric memory component as corresponding to the particular logical block of the logical volume and that identifies the particular physical block within the first disruption region of the asymmetric memory component as actually storing the first quantum of application data may be accessed. Additionally or alternatively, the metadata that identifies the particular physical block within the second disruption region of the asymmetric memory component as corresponding to the individual logical block of the logical volume and that identifies the particular physical block within the second disruption region of the asymmetric memory component as actually storing the second quantum of application data may be accessed. Based on accessing the metadata stored in the at least two different disruption regions of the asymmetric memory component, physical blocks within the different disruption regions of the asymmetric memory component that correspond to logical blocks of the logical volume and that store application data associated with their corresponding logical blocks may be identified. For example, it may be determined that the particular physical block within the first disruption region of the asymmetric memory component corresponds to the particular logical block of the logical volume and actually stores the first quantum of application data. In addition, it may be determined that the particular physical block within the second disruption region of the asymmetric memory component corresponds to the individual logical block of the logical volume and actually stores the second quantum of application data. Furthermore, for at least one other logical block of the logical volume, it may be determined that a specific physical block within the asymmetric memory component that the accessed metadata identifies as corresponding to the other logical block and storing a third quantum of application data associated with the other logical block was written to more recently than at least one other physical block within the asymmetric memory component that the accessed metadata identifies as corresponding to the other logical block and storing a third quantum of application data associated with the other logical block.

Based on having identified physical blocks within the different disruption regions of the asymmetric memory component that correspond to logical blocks of the logical volume and that store application data associated with their corresponding logical blocks, the recreated volume information table may be configured to map logical blocks within the logical volume to the corresponding physical blocks that store application data associated with the logical blocks to which they correspond. For example, the recreated volume information table may be configured to map the particular physical block within the first disruption region of the asymmetric memory component to the particular logical block within the logical volume based on having determined that the particular physical block within the first disruption region of the asymmetric memory component corresponds to the particular logical block of the logical volume and actually stores the first quantum of application data. In addition, the recreated volume information table may be configured to map the particular physical block within the second disruption region of the asymmetric memory component to the individual logical block within the logical volume based on having determined that the particular physical block within the second disruption region of the asymmetric memory component corresponds to the individual logical block of the logical volume and actually stores the second quantum of application data. Similarly, the recreated volume information table may be configured to map the specific physical block within the asymmetric memory component to the other logical block within the logical volume based on having determined that the specific physical block was written to more recently than at least one other physical block within the asymmetric memory component that the accessed metadata identifies as corresponding to the other logical block and storing the third quantum of application data associated with the other logical block.

In some implementations, an instruction may be received to create a logical volume. The instruction to create the logical volume may specify a name for the logical volume and a number of logical blocks to be included within the logical volume. In response to receiving the instruction to create the logical volume, the logical volume and a volume metadata structure may be created. The volume metadata structure may be configured by writing the name for the logical volume to the volume metadata structure, writing the number of logical blocks included within the logical volume to the volume metadata structure, determining a relative time at which the logical volume is created, and writing the determined relative time at which the logical volume was created to the volume metadata structure.

At some point, an instruction to extend the logical volume to include an additional number of logical blocks may be received. In response, the logical volume may be extended to include the additional number of logical blocks, and the volume metadata structure may be updated to reflect that the logical volume has been extended to include the additional number of logical blocks.

In some implementations, one or more physical blocks within the first disruption region of the asymmetric memory component may be reserved exclusively for storing metadata related to other physical blocks within the first disruption region of the asymmetric memory component. In such implementations, the metadata related to the first write operation may be written to one or more of the physical blocks within the first disruption region of the asymmetric memory component that are reserved exclusively for storing metadata. For example, first and second physical blocks within the first disruption region of the asymmetric memory component may be reserved exclusively for storing metadata related to other physical blocks within the first disruption region. Writing the metadata related to the first write operation may include determining that metadata stored in the first physical block reserved exclusively for storing metadata reflects a present state of the first disruption region and that the second physical block reserved exclusively for storing metadata is available to be written to, copying metadata stored in the first physical block reserved exclusively for storing metadata, updating the metadata copied from the first physical block reserved exclusively for storing metadata to include the metadata related to the first write operation, and writing the updated metadata to the second physical block reserved exclusively for storing metadata.

Additionally or alternatively, a log may be maintained in the one or more physical blocks within the first disruption region of the asymmetric memory component that are reserved exclusively for storing metadata related to other physical blocks within the first disruption region of the asymmetric memory component. In such cases, the log may include metadata entries related to previous write operations that have been performed on other physical blocks within the first disruption region of the asymmetric memory component and writing the metadata related to the first write operation may include adding a new metadata entry related to the first write operation to the log. It may be detected that a current size of the log maintained in the first physical block reserved exclusively for storing metadata exceeds a predetermined threshold value. In response, the log maintained in the first physical block reserved exclusively for storing metadata may be copied, the copied log may be collapsed by removing one or more outdated entries from the copied log, the collapsed log may be written to the second physical block reserved exclusively for storing metadata, and the first physical block reserved exclusively for storing metadata may be erased.

In some implementations, the instruction to write a first quantum of application data to the asymmetric memory component may be an instruction to update a first quantum of application data stored in a sector of a particular physical block within the first disruption region of the asymmetric memory component, and writing the first quantum of application data may include writing the updated first quantum of application data to the sector of the particular physical block, or copying application data from other sectors of the particular physical block to another physical block, and writing the updated first quantum of application data to a sector of the other particular block.

In yet another general aspect, a memory storage system for storing data for an electronic device includes a first disruption region (e.g., bank) of asymmetric memory and a second disruption region (e.g., bank) of asymmetric memory. Each disruption region is configured to enable write operations to individual physical data blocks within the disruption region such that writing to an individual physical data block within the disruption region affects the availability of other physical blocks within the disruption region. The first disruption region includes a set of physical data blocks for storing application data, a physical metadata block that is reserved for storing metadata related to application data stored in the physical data blocks of the first disruption region and another physical metadata block that is reserved for storing a redundant copy of the metadata. The second disruption regions includes a set of physical data blocks for storing application data, a physical metadata block that is reserved for storing metadata that is related to application data stored in the physical data blocks of the second disruption region, and another physical metadata block that is reserved for storing a redundant copy of the metadata.

Implementations may include one or more of the following features. For example, the physical metadata blocks in the first disruption region may be configured to maintain a log for storing metadata entries that are related to write operations performed on individual physical data blocks within the first disruption region of asymmetric memory and that identify individual physical data blocks within the first disruption region as corresponding to individual logical blocks and storing application data associated with the individual logical blocks to which the individual physical data blocks within the first disruption region are identified as corresponding. Similarly, the physical metadata blocks in the second disruption region may be configured to maintain logs for storing metadata entries that are related to write operations performed on individual physical data blocks within the second disruption region and that identify individual physical data blocks within the second disruption region as corresponding to individual logical blocks and storing application data associated with the individual logical blocks to which the individual physical data blocks within the second disruption region of asymmetric memory are identified as corresponding. Additionally or alternatively, entries in the logs also may specify relative times at which the application data was written to the individual physical data blocks.

In some implementations, one or more individual physical data blocks within the first disruption region may be configured to store data associated with individual logical blocks of a logical volume and one or more individual physical data blocks within the second disruption region of asymmetric memory also may be configured to store data associated with individual logical blocks of the logical volume.

Additionally or alternatively, the memory storage system may include a volatile memory component that is different from the first disruption region of asymmetric memory and the second disruption region of asymmetric memory. In such implementations, the volatile memory component may include a volume information table that is configured to map individual logical blocks of the logical volume to corresponding individual physical data blocks within the first and second disruption regions that store data associated with the individual logical blocks to which they correspond. Furthermore, the logical volume may include a number of logical blocks, and the memory storage system may include a volume metadata structure that is configured to store metadata related to the logical volume and that includes a name for the logical volume, the number of logical blocks within the logical volume, and a relative time at which the logical volume was created.

The various aspects, implementations, and features may be implemented using, for example, one or more of a method, an apparatus, a system, an apparatus, system, tool, or processing device for performing a method, a program or other set of instructions, an apparatus that includes a program or a set of instructions, and a computer program embodied in a tangible computer readable medium. The tangible computer readable medium may include, for example, instructions, software, images, and other data.

DESCRIPTION OF DRAWINGS

FIG. 7 is a block diagram of a volume metadata structure that stores volume metadata for an individual logical volume that is stored in an asymmetric memory system.

FIG. 10 is a flowchart of an example of a process for recreating a volume information table that tracks relationships between logical eraseblocks of a logical volume and physical eraseblocks of an asymmetric memory system based on eraseblock metadata that is distributed across multiple different banks of asymmetric memory within the asymmetric memory system.

DETAILED DESCRIPTION

Figure 1:
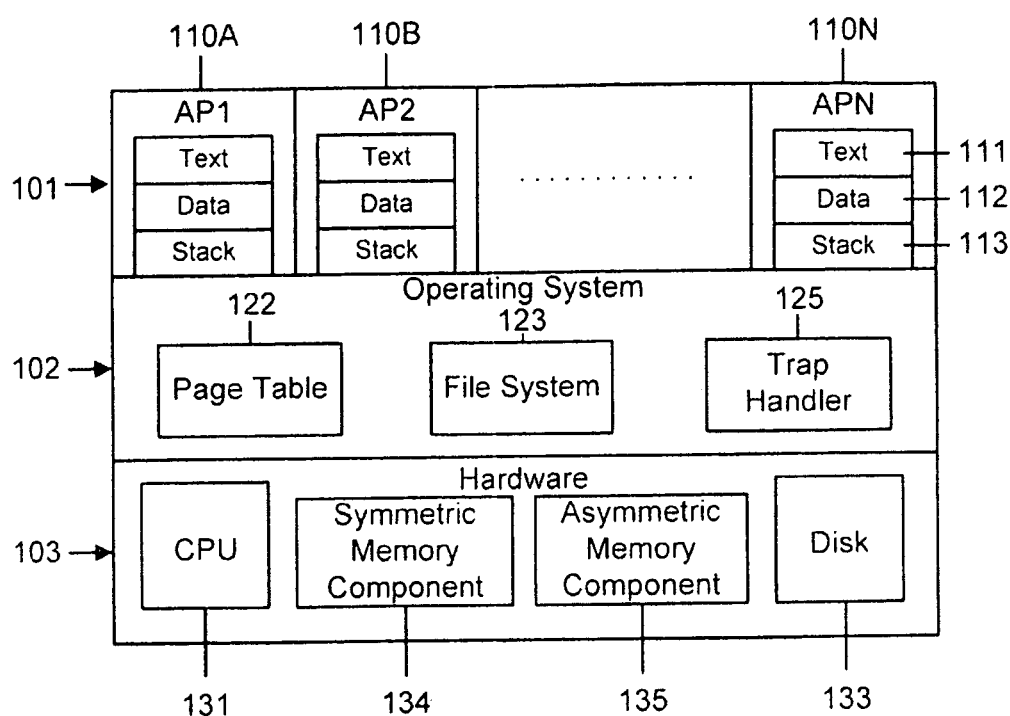
FIG. 1 illustrates an example of a first layer model of a computing system.

The detailed description is divided into four sections. Section A provides a brief description of methods and mechanisms disclosed. Section B provides a description of hardware, software, and system context. Section C provides a description of reading and writing data. Section D provides a discussion of operations performed and additional configurations.

A. Brief Description

Memory systems may be composed of symmetric components (e.g., Dynamic Random Access Memory (DRAM)), asymmetric components (e.g., flash memory), or a hybrid mix of both symmetric and asymmetric components.

DRAM memory components may be considered to be symmetric memory components because, in DRAM memory components, read and write operations generally can be performed at comparable rates and generally incur similar run times. Furthermore, read and write operations do not markedly degrade the lifespan of DRAM memory components.

Asymmetric memory components, such as, for example, flash memory, may be described as exhibiting asymmetric characteristics because, for example, read operations may be performed relatively quickly, while write operations may be performed relatively slowly in comparison to read operations. In addition, for some categories of asymmetric memory components, write operations may degrade the lifespan of the asymmetric memory components more rapidly than read operations.

Asymmetric memory components also may behave differently than symmetric memory components in other ways as well. For example, writing data to an asymmetric memory component may impact multiple blocks of the asymmetric memory component. In fact, the term disruption region generally is used to reference a region of an asymmetric memory component whose access behavior is impacted (often undesirably) during a write operation to the asymmetric memory component. For example, during a write operation to a block of the asymmetric memory component, read operations on a disruption region associated with the block being written to may suffer corrupt data, access delays, and/or an inability to have confidence in results that are returned from the read operation (even if the results are correct and/or not delayed). Furthermore, although the data to be written may itself affect only a portion of the disruption region, a write can affect a larger amount of storage within the disruption region. To illustrate, writing a 2 Mbyte block during a block write may generate disruptions in a 2 GByte disruption region of a 16 Gbyte asymmetric memory component.

Main memory generally is directly accessible by a CPU. To enable the CPU to access data from main memory quickly, it therefore may be important for main memory to support relatively fast read operations. Main memory generally is composed of volatile, symmetric memory components. However, in some implementations configured to support relatively fast read operations, asymmetric memory components may be used in main memory to replace and/or to augment traditional volatile, symmetric memory components. When asymmetric memory components that are non-volatile are used in main memory to replace and/or to augment traditional volatile, symmetric memory components, the non-volatile, asymmetric memory components also may be used as secondary storage at the same time that they are being used as main memory. Using non-volatile, asymmetric memory components in this manner, as both main memory and secondary storage, may improve performance by, for example, enabling fast access to data otherwise (or additionally) written to traditional secondary storage, without requiring an initial/intervening step of transferring the data from traditional secondary storage to main memory.

When non-volatile asymmetric memory components are used as both main memory and secondary storage, the asymmetric memory components may be formatted using a file system format that provides a level of abstraction in order to organize the physical blocks of the asymmetric memory components into logical volumes and to keep track of information such as the correspondence between physical blocks and logical volumes.

For instance, in order to keep track of which physical blocks correspond to which volumes, the file system may maintain metadata that records the relationships between the logical block numbers utilized by the file system and the physical blocks of the asymmetric memory component that actually store the data that corresponds to the logical block numbers utilized by the file system. Consequently, in the event of a power down, system failure, or other event that impairs the computer system's ability to resolve the logical block numbers utilized by the file system to the physical blocks of the asymmetric secondary storage that actually store the data that corresponds to the logical block numbers utilized by the file system, it may be possible for the computer system to rediscover the relationships between the logical block numbers utilized by the file system and the physical blocks of the asymmetric secondary storage that actually store the data that corresponds to the logical block numbers utilized by the file system by accessing the metadata that records these relationships.

To enable efficient management of such metadata in an asymmetric memory component, the metadata may be distributed across various different disruption regions of the asymmetric memory component. For example, one or more physical blocks within each disruption region of an asymmetric memory component may be reserved for storing metadata associated with the other physical blocks within the disruption region including metadata that identifies the logical block numbers to which various different physical blocks within the disruption correspond. When a write operation is performed to write data corresponding to a logical block number utilized by the file system to a physical block of a particular disruption region, the reserved metadata block(s) for the particular disruption region also may be updated to reflect the logical block number to which the data written to the physical block corresponds. In this manner, the reserved metadata blocks distributed across the different disruption regions of the asymmetric memory component may record all (or most) of the relationships between logical block numbers utilized by the file system and the physical blocks of asymmetric memory that actually store the data that corresponds to the logical block numbers utilized by the file system.

In the context of an asymmetric memory component, distributing metadata across the different disruption regions of the asymmetric memory component may enable more efficient management of the metadata than storing all of the metadata in one, centralized location on the asymmetric component. For example, if data is to be written to a physical block located in a first disruption region of an asymmetric memory component and all of the metadata is stored in a second disruption region of the asymmetric memory component, both the first disruption region and the second disruption region will experience disruptions as a consequence of writing the data to the physical block. This is because a first write operation must be performed on the first disruption region to write the data to the physical block and a second write operation must be performed on the second disruption region to update the metadata to record the logical block number to which the data written to the physical block of the first disruption region corresponds. In contrast, if the metadata is distributed across the disruption regions of the asymmetric memory component, the metadata associated with a physical block that is being written to is located in the same disruption region as the physical block that is being written to, and the metadata can be updated at the same time that the data is written to the physical block. Consequently, when the metadata is distributed across the disruption regions of the asymmetric memory component, only one disruption region may be impacted each time data is written to a physical block within the asymmetric memory component, and, therefore, a larger portion of the asymmetric memory component may remain available for read operations while data is being written to a physical block within the asymmetric memory component. Preserving a larger portion of the asymmetric memory component for read operations in this manner may be particularly advantageous in systems in which the asymmetric memory component is being used as both main memory and secondary storage because a larger portion of the asymmetric memory remains available for main memory read operations. Moreover, disaggregating this information may be used to enable improvements in fault tolerance.

B. Description of Hardware, Software, and System Context

Referring now to FIG. 1, an example of a first layer model 100 of a computing system is illustrated. The first layer model 100 includes an application (AP) layer 101, an operating system (OS) layer 102, and a hardware (HW) layer 103. The AP layer 100 includes one or more application processes AP1 110A through APN 110N.

Examples of application processes may include a web browsing or hosting program, a word processing program, a search program, a data mining and analytical program, or other type of application configured to execute on the AP layer 101. Application programs may be stored on a disk and remain in a passive state until a user chooses to execute an application program where it is loaded into memory as an application process.

Although other application processes may be employed, each application process (AP1 110A to APN 110N) loaded into memory may be allocated space in the main memory including a text region 111, a data region 112, and a stack region 113. The text region 111 may include executable instructions associated with the application program. The data region 112 may include data associated with the application. The data may be dynamic and/or static. The stack region 113 may include a state of a function or procedure of the application program and its activation frame.

The hardware layer 103 may include a central processing unit or processor 131, a symmetric memory component 134, an asymmetric memory component 135, and a hard disk storage 133. Collectively, the symmetric memory component 134 (e.g., DRAM) and the asymmetric memory component 135 (e.g., flash memory) may function as main memory. In addition to functioning as main memory, the asymmetric memory component 135 also may function as secondary storage. An interface between the asymmetric memory component 135 and the rest of the computing system may be provided by a controller (not shown) that receives commands to read and/or write data to the asymmetric memory component 135. In one implementation, the asymmetric memory component 135 is NOR flash electrically erasable programmable read only memory (EEPROM).

The operating system layer 102 resides between the HW layer 103 and the AP layer 101. The operating system layer 102 may be a modified operating system, such as Microsoft Windows, Linux, or other flavors of Unix, configured to manage hardware included in the HW layer 103 of the computer system. The operating system layer 102 may include a page table 122, a file system 123, and a trap handler 125.

During execution, an application process may request to write data to or read data from secondary storage (e.g., a portion of asymmetric memory component 135 and/or hard disk storage 133). In such cases, when an application process issues a request to access secondary storage, the file system 123 may receive the request to access the secondary storage from the application process and, in response, the file system 123 may infer the logical block number to be accessed. The inferred logical block number then may be translated, for example by another software module in the operating system or by a physical controller, into a physical block number associated with secondary storage. After determining the appropriate physical block number, the controller may perform the requested access operation on the physical block within secondary storage. For example, if the application process requests to write data to secondary storage, the controller may write the data to the physical block within secondary storage. In contrast, in the event that the application process requests to read data from secondary storage, the controller may retrieve data from the physical block within secondary storage and store the retrieved data in main memory.

Multiple processes, during their execution, may place demands on main memory in a computer system. The operating system may respond to those demands for main memory by managing how physical memory is allocated to a virtual address space of each process executing on the AP layer 101. In some implementations, the operating system may use virtual memory management techniques to indicate to the application processes that there is more memory capacity available for use over and beyond the physical memory capacity in main memory. In these implementations, the operating system 102 maintains a page table 122 to map virtual addresses in application processes to physical addresses in main memory. The asymmetric memory component 135, functioning as secondary storage, and/or the hard disk storage 133 may be used to provide additional memory capacity for an application process.

Virtual memory management techniques may be configured to estimate the immediate memory needs in a specified application and allocate physical memory responsive to the specified application's needs, as opposed to other memory requirements that can be deferred and allocated to the asymmetric memory component 135, functioning as secondary storage, and/or hard disk storage 133. A contiguous addressable range of memory, referred to as a page, may be swapped between physical main memory and the asymmetric memory component 135, functioning as secondary storage, and/or hard disk storage 133 as its need for immediate use increases or decreases.

C. Description of Reading and Writing Data

Figure 2A:
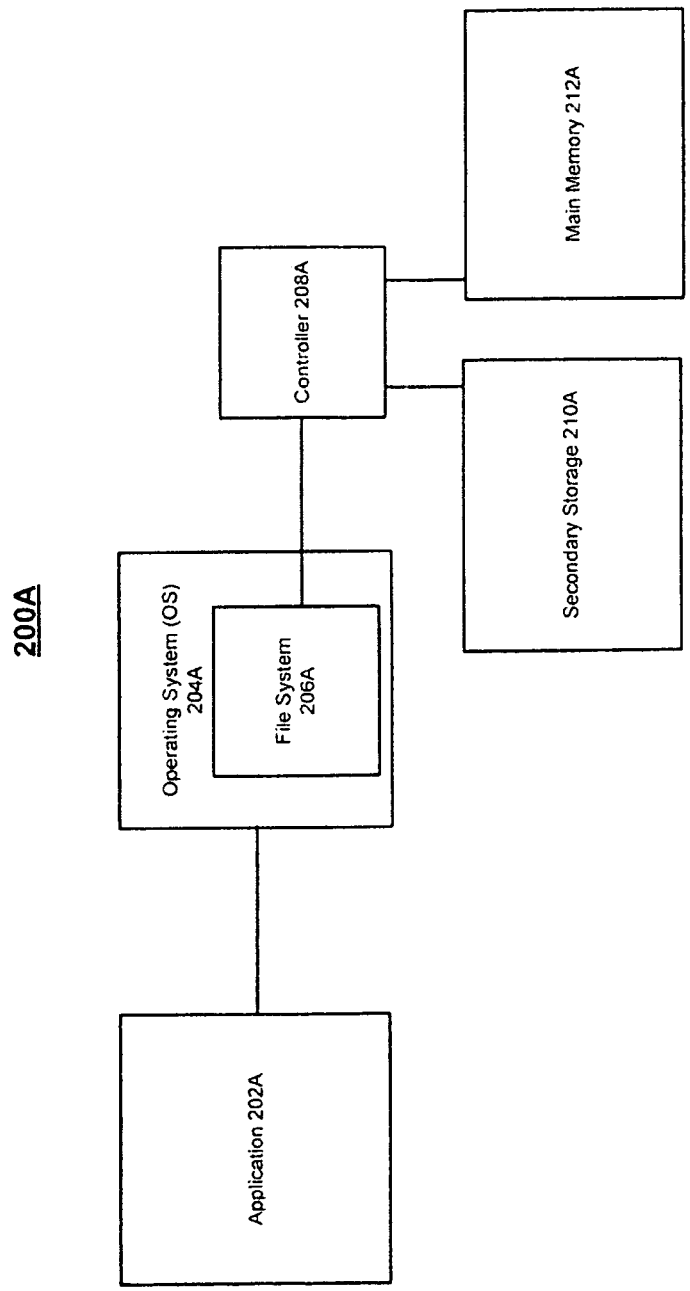
FIG. 2A is a block diagram that illustrates an application interfacing with secondary storage through a file system and a controller.

FIG. 2A is a block diagram of a computer system 200A that includes an application 202A, an operating system 204A including a file system 206A, a controller 208A, secondary storage 210A, and main memory 212A. In some implementations, the secondary storage 210 may include asymmetric memory components and the main memory 212A may include a hybrid mix of symmetric and asymmetric memory components. In such implementations, an individual asymmetric memory system may function as both secondary storage and main memory. As illustrated in FIG. 2A, the application 202A interfaces with secondary storage 210A through the file system 206A and the controller 208A.

In order to write data to or read data from secondary storage 210A, application 202A issues a request to access secondary storage 210A. The request to access secondary storage is received by the file system 206A (which generally is a software module within the operating system 204A), which infers from the request the logical block number to be accessed. The file system 206A then instructs the controller 208A to access the logical block corresponding to the inferred logical block number. In response, the controller 208A translates the logical block number into an actual physical block number of the secondary storage 210A and performs the requested access operation on the physical block. In the event that the application 202A requests to write data to the secondary storage 210A, the controller 208A writes the data to the appropriate physical block within secondary storage 210A. Alternatively, if the application 202A requests to read data from the secondary storage 210A, the controller 208A retrieves the requested data from the appropriate physical block within the secondary storage 208A and stores the retrieved data in main memory 212A.

While application 202A writes data to and reads data from secondary storage 210A, application 202A concurrently may write data to and read data from main memory 212A. In some implementations, asymmetric memory components may be configured to function both as secondary storage 210A and main memory 212A. In such implementations, application 202A may write data to and read data from secondary storage 210A by writing data to and reading data from the same asymmetric memory components that application 202A is writing data to and reading data from as main memory.

Figure 2B:
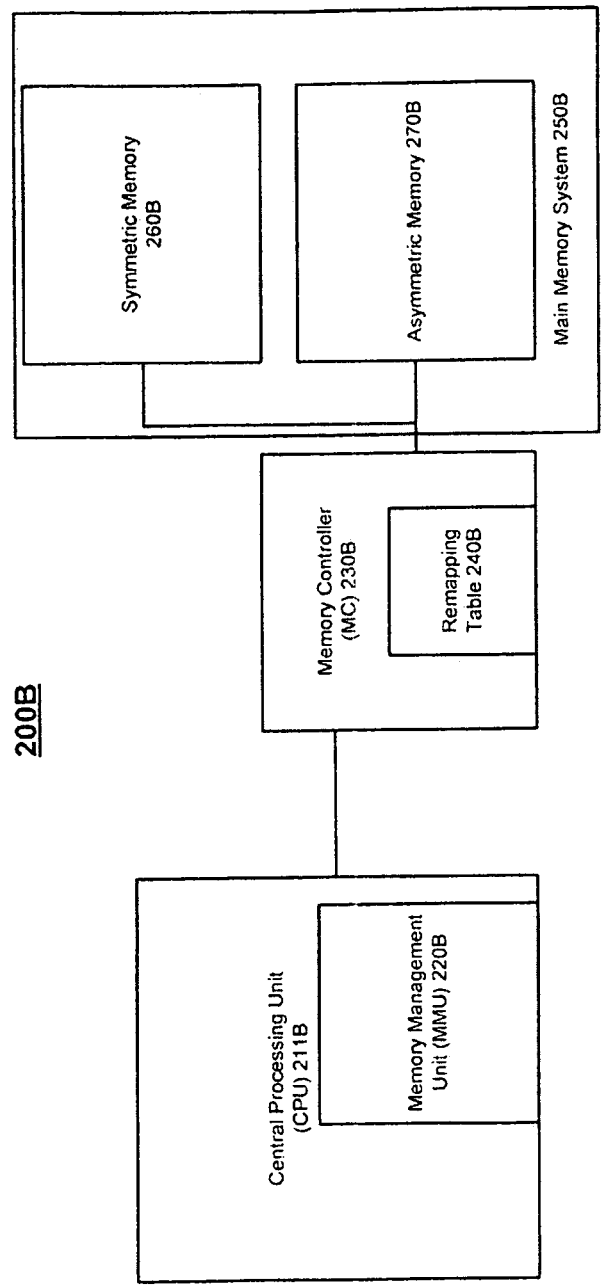
FIG. 2B is a block diagram of a central processing unit that interfaces with a hybrid main memory system through a memory controller.

FIG. 2B is a block diagram that illustrates how a CPU may write data to and read data from main memory. More particularly, FIG. 2B is a block diagram of a computer system 200B with a CPU 211B that includes a memory management unit (MMU) 220B and that interfaces with a main memory system 250B through a memory controller 230B. More precisely, the memory controller 230B is positioned, oriented, and configured to enable it to be leveraged in processing read and write requests from the memory management unit 220B to the main memory system 250B while shielding the CPU 211B from challenges resulting from particular access characteristics associated with asymmetric memory 270B. In some implementations, main memory system 250B may include asymmetric memory components that function as both main memory and secondary storage. In such implementations, the memory controller 230B may be leveraged to process both main memory and secondary storage read and write requests. As such, the memory controller 230B may function as, or be the same as, the memory controller 208A illustrated in and discussed in connection with FIG. 2A.

The CPU 211B includes logic configured to implement one or more processing operations. Examples of a CPU 211B may include x86-based processors from Intel Inc. and Advanced Micro Devices Inc. (AMD), and/or ARM (TM) processors. The CPU 211B may include one or more processor cores.

Generally, each CPU 211B interfaces with an operating system. The operating system, in turn, may interface with one or more applications. These applications may include a search engine, business analytics, data mining, and/or database operations. Each of these applications may be compiled (or interpreted) into different machine-level instructions for execution on the CPU 211B. Although only one CPU 211B is shown, multiple CPUs may be used. Each CPU 211B supports an instruction set with a variety of instructions. These instructions may include, among other operations, register shifts, arithmetic operations, and memory operations. Examples of the memory operations may include random access read and write operations and I/O read and write instructions that can be used to initiate block read and write operations.

As shown, the CPU 211B includes a memory management unit 220B. Generally, the memory management unit 220B is configured to manage a physical address space for the CPU 211B. As the CPU 211B is executing a program, the CPU 211B may request to read data from a particular address and write data to a particular address. More precisely, the memory management unit 220B may be configured to receive a virtual address from the CPU 211B and translate the virtual address into a physical address (i.e., a memory management unit-specified physical address). In the case of a read, the CPU 211B may be configured to consult the memory management unit 220B to obtain the physical address associated with the virtual address specified by the CPU 211B. The memory management unit 220B (or some other entity) in the CPU 211B is instructed to retrieve data from the MMU-specified physical address. Other systems (e.g., the memory controller 230B) may, in turn, process the memory management unit-specified physical address as an additional type of virtual address. In another configuration where a translation element of an MMU is separated out from the portion of the CPU that is responsible for interacting with the memory system, the MMU may be configured to obtain the physical address associated with the virtual address. The MMU (or another entity in the CPU) then may be instructed to retrieve data from the MMU-specified physical address.

The memory controller 230B is logically oriented as an intermediary system to enable the CPU 211B to interface with a main memory system 250B. More precisely, the memory controller 230B is a system configured to receive read and write instructions with a memory management unit-specified physical address from the memory management unit 220B, lookup a memory controller-specified physical address associated with the memory management unit-specified physical address, and perform the requested read and/or write instruction on the block(s) of physical memory corresponding to the memory controller-specified physical address.

The memory controller 230B includes logic (hardware and/or software) configured to manage the placement of and movement of data within a main memory system 250B. The memory controller 230B may be configured to dynamically process instructions based on a determination of whether the data and/or address is associated with symmetric memory or asymmetric memory. Similarly, the memory controller 230B may be configured to process read instructions in a first way, and process write instructions in a second way. For example, the memory controller 230B may be configured to permit read operations from the memory management unit that specify a particular address to leverage or otherwise operate on a first address within asymmetric memory 270B, while concurrently processing write operations from the memory management unit that specify a particular address to leverage or otherwise operate on a second address within symmetric memory 260B.

The memory controller 230B includes a physical interface to the main memory system 250B. The physical interface is configured to automatically exchange physical address information as the memory controller 230B interfaces with the memory system 250B.

The memory controller 230B includes a remapping table 240B that stores an association between a memory management unit-specified physical address and a memory controller-specified physical address. The remapping table 240B may associate multiple memory controller-specified physical addresses with a memory management unit-specified physical address. For example, the remapping table 240B may be configured to indicate that writes to the disruption region should be directed to a "new" physical address range for the memory management unit, while reads from the disruption region should be directed to the "old" physical address range. Moreover, the remapping table 240B may indicate that a particular memory management unit-specified physical address is associated with a disruption region. For example, high-order address bits and some low-order bits in the MMU-supplied physical address may be analyzed to indicate which bank is being used. Alternatively, the memory controller 230B may include logic (or include another column in a software table) that identifies the bank being used. Configuring the memory controller 230B to have a bank identifier readily available may be used to reduce the processing burden of identifying a bank, for example, when performing write operations. The main memory system 250B may include symmetric memory 260B and asymmetric memory 270B. As described above, in addition to functioning as main memory, the asymmetric memory 270B also may function as secondary storage. The main memory system 250B may be packaged as one or more DIMMs (Dual Inline Memory Modules) and configured to support DIMM protocols, signaling, interconnects, and physical interfaces.

The symmetric memory 260B includes one or more memory systems where read characteristics have similar properties to the write characteristics. Examples of symmetric memory include DRAM and other random access memory technologies.

The asymmetric memory 270B includes one or more memory systems where read characteristics and write characteristics are dissimilar. For example, some types of asymmetric memory have write latencies that are orders of magnitude greater than the read latencies. Examples of asymmetric memory may include NOR flash. With some types of asymmetric memory, an interface is used to (among other things) require an entire region of content to be rendered inaccessible to read requests whenever any constituent block of the region is written, for example, using an I/O block write, instead of a smaller, random access write to the specific update location.

In configurations where the main memory system 250B resides in DIMM packaging, the DIMM may be configured to dynamically process read and write instructions. For example, in a read mode, one or more DIMMs may be configured to receive instructions to access content residing at a particular physical address, and provide requested content to the processor 211B through the memory controller 230B. Generally, in a write mode, the DIMM is configured to receive data to be written with a physical address. Depending on whether the physical address represents DRAM or flash, the data may be written in a random access manner (e.g., a word or byte) or in a block (e.g., a 4 Megabyte or a 4 kilobyte block). In one configuration, the DIMM is entirely made up of one type of memory (e.g., DRAM or NOR flash). In another implementation, the DIMM includes a hybrid mix of both DRAM and flash and relies on an internal or external memory controller to perform the different operations required to implement a hybrid memory system. And, although one or more configurations were described where a hybrid and/or dedicated configuration was used, a different configuration may be used.

An application being executed by a CPU may write data to and read data from secondary storage as described above in connection with FIG. 2A while concurrently writing data to and reading data from main memory as described above in connection with FIG. 2B.

D. Discussion of Operations Performed and Additional Configurations

Figure 3A:
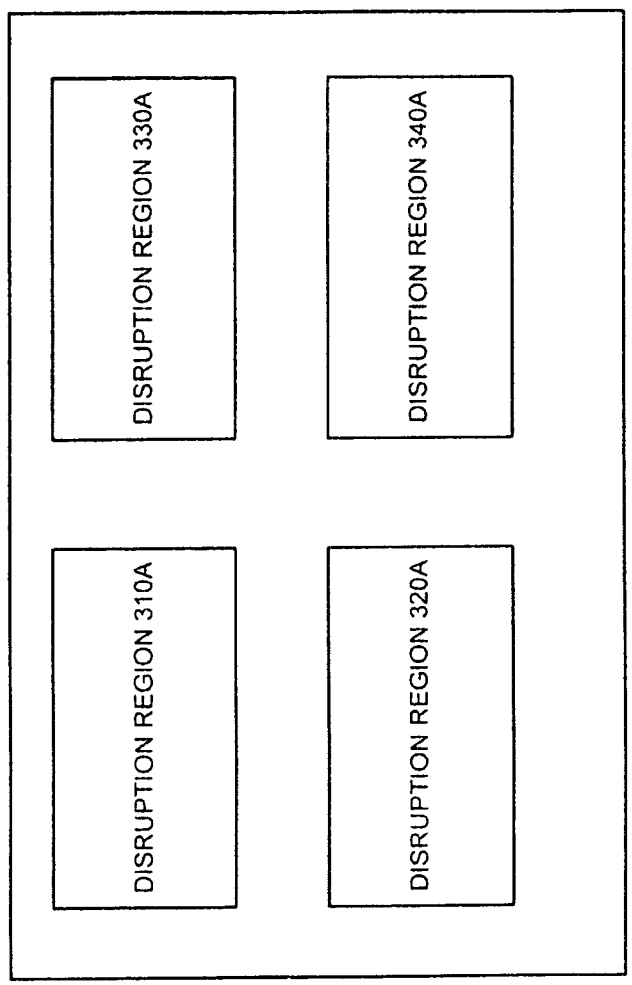
FIG. 3A is a block diagram that illustrates disruption regions in an asymmetric memory system.

FIG. 3A is a block diagram that illustrates disruption regions in an asymmetric memory system 300A. In asymmetric memory, disruption regions 310A-340A represent four areas of memory where a write to one address in a region causes proximate memory addresses in the region to demonstrate disruptive behavior. In one instance, an individual disruption region represents other memory cells that rely on a common internal write controller within the asymmetric memory. In another instance, an individual disruption region represents a range of addresses that are logically or physically grouped. As described further below, a disruption region in an asymmetric memory system often corresponds to a bank of asymmetric memory within the asymmetric memory system.

Figure 3B:
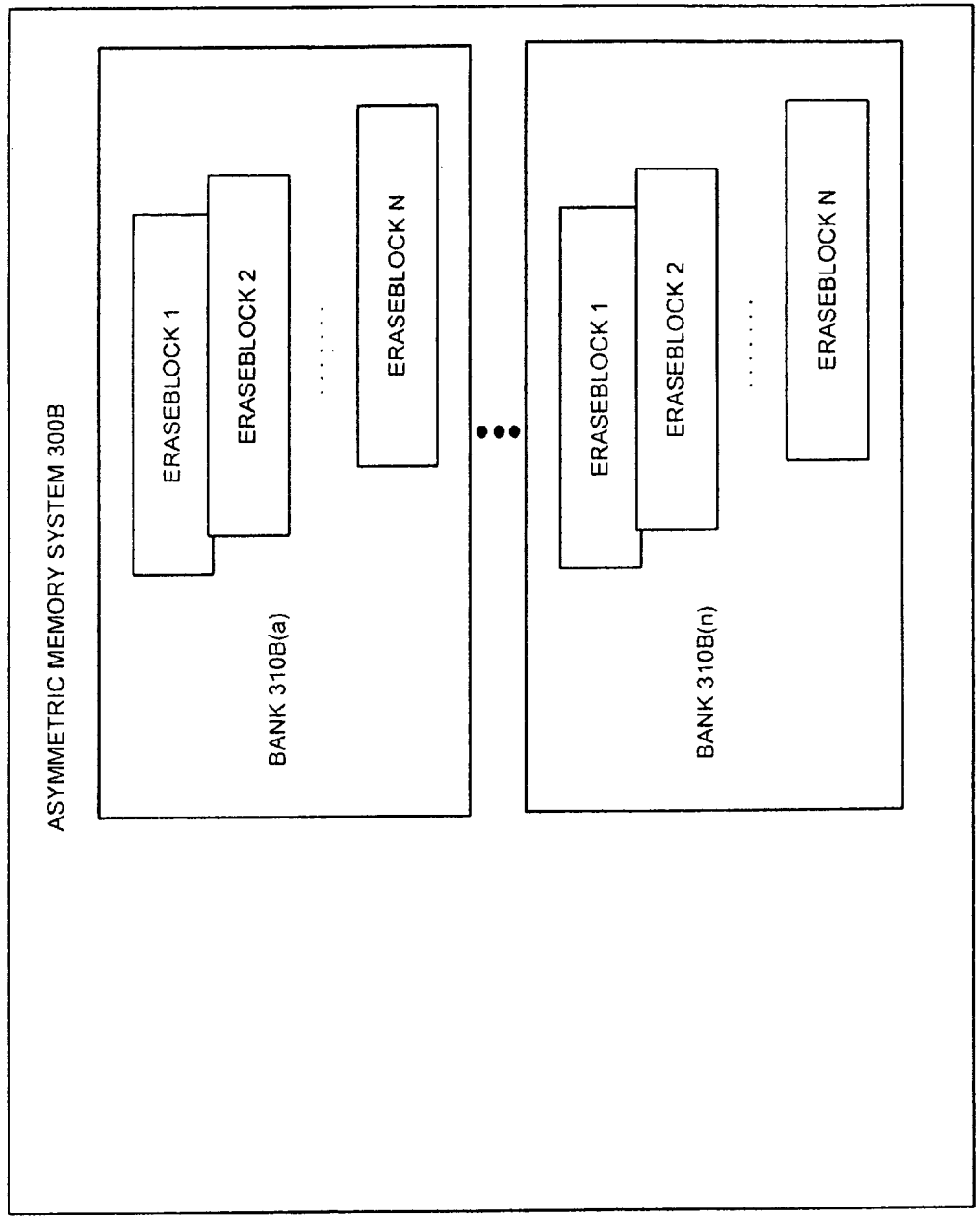
FIG. 3B is a block diagram of an example of an asymmetric memory system.

FIG. 3B is a block diagram of an example of an asymmetric memory system 300B. More precisely, FIG. 3B is a block diagram of an example of a NOR flash chip. The NOR flash chip may be used as secondary storage for a computer system or other electronic device and/or the NOR flash chip may be used as (or a component of) main memory for a computer system or other electronic device. The NOR flash chip receives commands from one or more memory controllers over a chip interface (not shown). A NOR flash chip includes a number of banks, as illustrated by banks 310B(a) . . . 310B(n) of asymmetric memory. In addition, each bank includes a number of eraseblocks <1 . . . n>, which represent the level of granularity at which a region in the NOR flash chip can be erased (before it can be rewritten with possibly new data). Furthermore, each individual eraseblock may include one or more sectors (not shown), which represent the level of granularity at which a region in the NOR flash chip can be written. In example implementations, banks may vary in size from 1 GByte to 4 GBytes, with eraseblocks varying in size from 4 Mbytes to 16 Mbytes and sectors occupying only a few KBytes or less.

The one or more memory controllers may be configured to directly address and read a specified word from any sector in any bank using, for example, random access instructions. However, as indicated above, writing data into NOR flash may be more involved. That is, writing to NOR flash may require special operations to accommodate the particular access characteristics of NOR flash. First, in one configuration, the specific eraseblock (for example, eraseblock 2 in bank 310B(a)) with the word to be written must be erased. Then, the "new" data may be written into the specified physical address within the eraseblock. Other new data then may be added to a proximate location within the specified eraseblock without requiring additional erases because the previous data residing at the proximate location was previously erased. Alternatively, due to some limitations in some configurations of NOR flash chips, if one eraseblock (for example, eraseblock 2 within bank 310B(a)) is being erased or written, data from the other eraseblocks (1, 3 . . . n) within bank 310B(a) are rendered contemporaneously unavailable for reading during the erase/write operation involving eraseblock 2 of bank 310B(a), while the other banks within the memory subsystem 300B remain available for reading. In this case, the bank 310B(a) represents an example of a disruption region.

Figure 4:
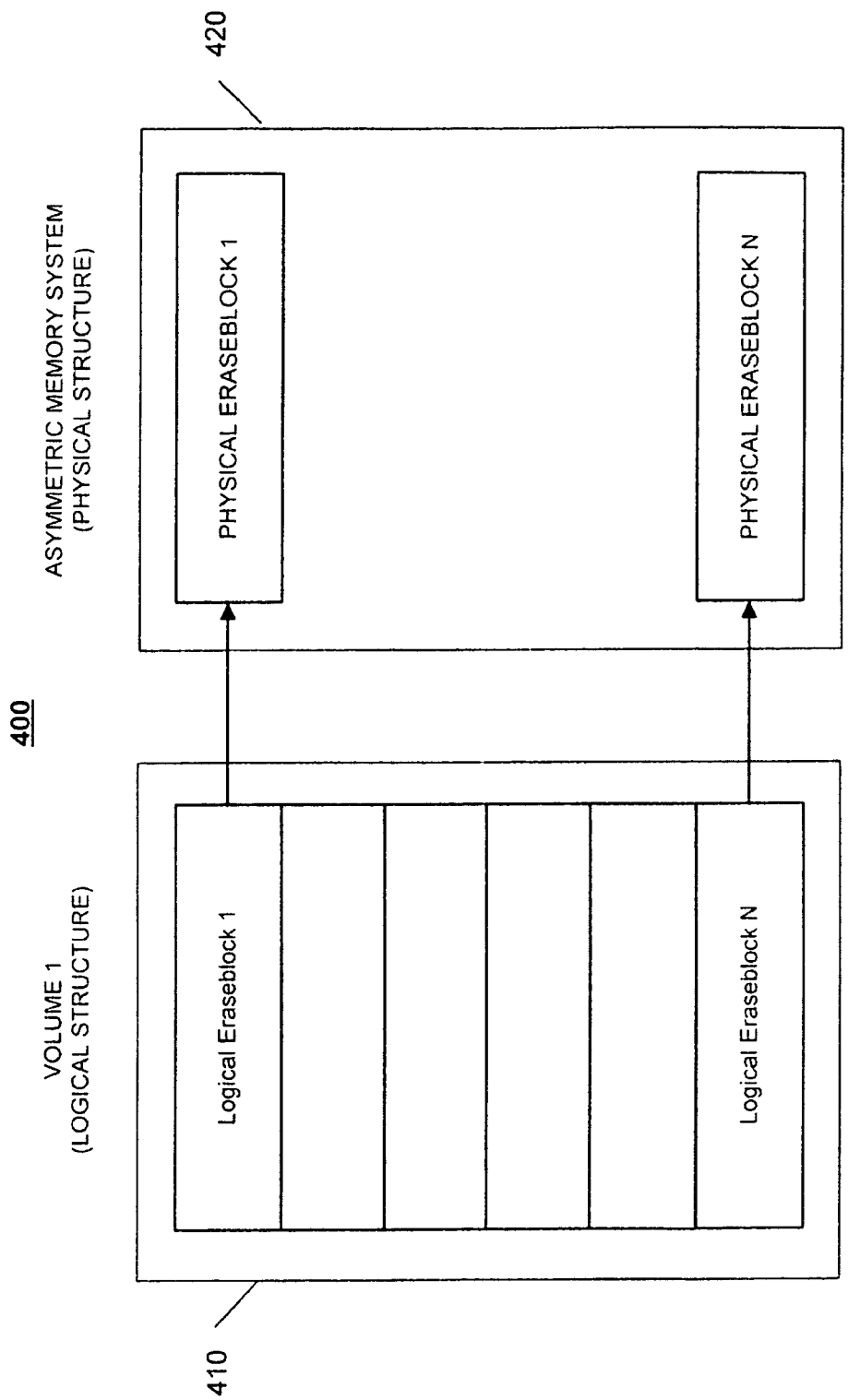
FIG. 4 is a block diagram that illustrates an example of individual logical eraseblocks within a logical volume being mapped to individual physical eraseblocks within an asymmetric memory system.

As discussed above, secondary storage that includes an asymmetric memory system may be formatted according to a file system that provides a level of abstraction for organizing the physical blocks of the asymmetric memory system into volumes and keeping track of such information as which physical blocks correspond to which volumes. The file system may support such standard file operations as creating a volume, writing application data to a volume, reading application data from a volume, etc. Under this framework, an individual volume includes one or more logical eraseblocks that each get mapped to a corresponding physical eraseblock in secondary storage. As such, there may be a one-to-one ratio between logical eraseblocks and physical eraseblocks FIG. 4 is a block diagram 400 that illustrates an example of individual logical eraseblocks within a logical volume 410 being mapped to individual physical eraseblocks within an asymmetric memory system 420. As illustrated in FIG. 4, Volume 1 410 includes logical eraseblocks 1 . . . N, and individual logical eraseblocks of Volume 1 410 correspond to actual physical eraseblocks in asymmetric memory system 420. For example, logical eraseblock 1 of Volume 410 corresponds to physical eraseblock 1 in asymmetric memory system 420 and logical eraseblock N of Volume 1 410 corresponds to physical eraseblock N in asymmetric memory system 420. In some cases, physical eraseblock 1 may be located within the same bank of asymmetric memory system 420 as physical eraseblock N, while, in other cases, physical eraseblock 1 and physical eraseblock N may be located within different banks of asymmetric memory system 420. That is to say, the data associated with Volume 1

410 may be distributed across various different physical eraseblocks and even different banks of asymmetric memory within asymmetric memory system 420.

During a read operation during which data is to be read from a particular logical eraseblock of Volume 1 410, a memory controller translates the logical block number of the particular logical eraseblock of Volume 1 410 into the physical block number of the physical eraseblock in asymmetric memory system 420 that corresponds to the particular logical eraseblock and the data stored in the physical eraseblock is accessed. Similarly, during a write operation during which data is to be written to a particular logical eraseblock of Volume 1 410, a memory controller translates the logical block number of the particular logical eraseblock of Volume 1 410 into the physical block number of a physical eraseblock in asymmetric memory system 420 and the data is written to the physical eraseblock. In some implementations, the data may be written "in place" to a physical eraseblock in asymmetric memory system 420 that already has been designated as corresponding to the logical eraseblock of Volume 1 410. In alternative implementations, the write operation may be accomplished by copying (and perhaps thereafter erasing) the data currently stored in a physical eraseblock in asymmetric memory system 420 that is designated as corresponding to the logical eraseblock of Volume 1 410, updating the copied data in accordance with the write operation, and writing the updated data to a new physical eraseblock in asymmetric memory system 420.

Metadata stored in main memory (e.g., volatile DRAM) may be used to support quick lookups when file system operations are performed. For example, a volume information table (or memory map, database, or similar structure) may be maintained in main memory to keep track of the relationships between the logical eraseblocks of Volume 1 410 and the physical erase blocks in asymmetric memory system 420 to which the logical eraseblocks of Volume 1 410 correspond. Due to the fact that the volume information table is stored in main memory, the volume information table may be lost completely or otherwise compromised as a result of powering down the computer or as a result of some other catastrophic event. Therefore, upon powering on the computer, the volume information table may need to be recreated. Metadata stored in the non-volatile asymmetric memory system 420 may enable the volume information table to be rebuilt in such circumstances.

The file system metadata stored in main memory may include a volume information table and a free block information table. In some implementations, the volume information table may be represented as an array of volume descriptors, where each volume descriptor records information about a file in the file system. For example, the volume descriptor for an individual file in the file system may include one or more volume attributes that identify the owner and/or group of the file's creator, the name of the file, the time the file was created, last modified, and/or last accessed, the length of the file, and/or the type of the file. The volume descriptor for an individual file in the file system also (or alternatively) may include volume layout information tracking the physical blocks in the asymmetric memory system that actually store the file's application data. The volume layout information may be represented by an array, where the "i-th" element of the array stores the ID of the physical block in the asymmetric memory system that stores the corresponding "i-th" block of the file.

The free block information table maintained in main memory is a data structure that records information about which of the physical blocks of the asymmetric memory component currently are not assigned to any file and/or volume and, therefore, are available to store application. In addition to storing data that identifies which of the physical blocks of the asymmetric memory component currently are not assigned, the free block information table also may store additional information about the available physical blocks of the asymmetric memory component. For example, for each block identified in the free block information table as being available, the free block information table also may store a record of the number of times the block has been erased. This information then can be used by the file system allocation algorithms to achieve more or less similar wear leveling across the physical blocks of the asymmetric memory component. For example, individual physical blocks of the asymmetric memory component that have been erased relatively few times may be allocated before individual physical blocks of the asymmetric memory component that have been erased relatively more times so as to attempt to maintain a relatively even number of erases across each physical block of the asymmetric memory component. In some implementations, the free block information table tracks the number of times each physical block as been erased irrespective of whether the physical block is assigned and uses this information to reflect the status of the unassigned physical blocks. Additionally or alternatively, the number of times the unassigned blocks have been erased may be derived from metadata stored in the asymmetric memory component and/or from some other data structure maintained in main memory.

In some implementations, the volume information table and the free block information table may be maintained in volatile main memory as separate and distinct data structures. In alternative implementations, a single data structure maintained in main memory may be utilized to record both volume information and free block information.

File system metadata also is stored in the asymmetric memory component and may be used to recreate the volume information table and/or the free block information table stored in main memory in the event that either the volume information table or the free block information table are compromised. For example, the asymmetric memory component may store volume metadata and per-block metadata. In such implementations, the volume metadata records the same volume attributes stored in main memory (e.g., the owner and/or group of the file's creator, the name of the file, the time the file was created, last modified, and/or last accessed, the length of the file, and/or the type of the file). The per-block metadata, on the other hand, records information that enables the volume layout portion of the main memory volume information table and the main memory free block information table to be rebuilt. In particular, for individual physical blocks of the asymmetric memory component, the per-block metadata records whether or not the physical block is available, and, if not, to which volume it is assigned and at what offset.

In order to reduce read disruptions while writing per-block metadata to the asymmetric memory system, the per-block metadata may be written to the same bank of the asymmetric memory system as the physical block to which the metadata corresponds, thereby resulting in a read disruption to only a single bank of the asymmetric memory system.

Following (or during the course of) operations against a logical volume, volume metadata and/or per-block metadata stored in the asymmetric memory system may be updated to reflect changes resulting from the operations performed against the logical volume. For example, when a new volume is created, new volume metadata may be created for the new volume, and, when an existing volume is extended, volume metadata may be updated to reflect the extension to the volume. Similarly, when an existing volume is written to, per-block metadata may be updated to reflect changes that occurred as a result of the write operation.

As described above, a volume information table (or memory map, database, or similar structure) may be used to keep track of the relationships between the logical eraseblocks of Volume 1 410 and the physical erase blocks in asymmetric memory system 420 to which the logical eraseblocks of Volume 1 410 correspond. Because the volume information table may be stored in volatile main memory, the volume information table may be lost as a result of powering down the system or as a result of some other catastrophic event. Therefore, it may be necessary to recreate the volume information table when the system is powered on. In such situations, the state of the file system may be recreated in main memory based on the file system metadata maintained in the asymmetric memory component.

For example, the per-block metadata distributed across different banks of asymmetric memory in asymmetric memory system 420 may be used to recreate the volume information table. In particular, the per-block metadata distributed across the different banks of asymmetric memory in asymmetric memory system 420 may be accessed to determine which physical erase blocks correspond to which logical eraseblocks and the volume information table may be recreated accordingly.

Figure 5:
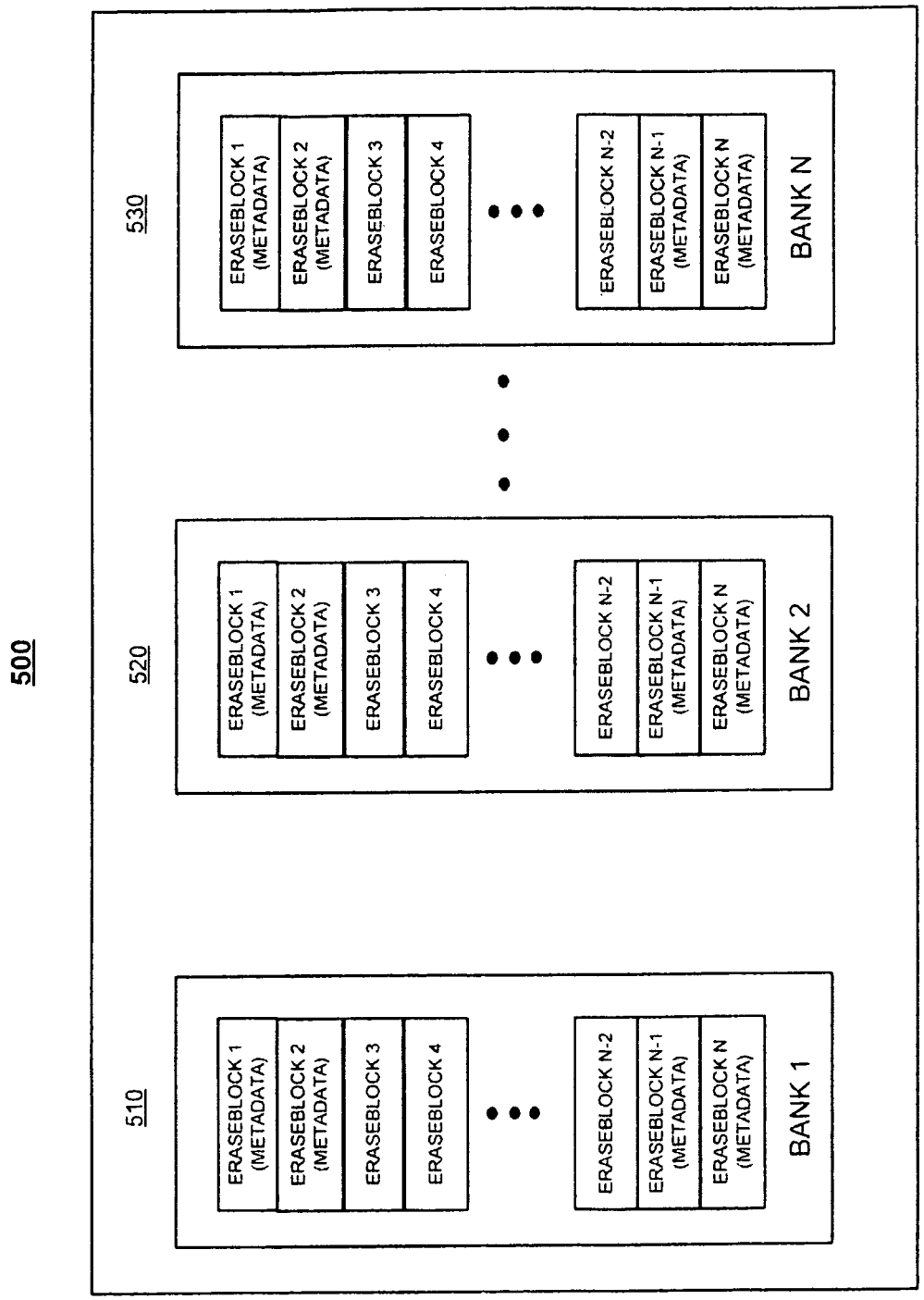
FIG. 5 is a block diagram of an example of an asymmetric memory system that includes metadata that is distributed across multiple banks of the asymmetric memory system.

FIG. 5 is a block diagram of an example of an asymmetric memory system 500 that includes metadata that is distributed across multiple banks of the asymmetric memory subsystem 500. Asymmetric memory system 500 includes Banks 1 . . . N 510, 520, 530 of asymmetric memory, each of which includes a number of physical eraseblocks <1 . . . N>. As illustrated in FIG. 5, the first two physical eraseblocks and the last two physical eraseblocks in each bank of asymmetric memory are configured to store metadata associated with the other eraseblocks within the bank of asymmetric memory. For example, the first two physical eraseblocks in Bank 1 510 (i.e., eraseblocks 1 and 2) and the last two physical eraseblocks in Bank 1 510 (i.e., eraseblocks N–1 and N) are configured to store metadata associated with the other eraseblocks within Bank 1 510 (i.e., eraseblocks 3 . . . . N–2). In some implementations, the metadata eraseblocks may be reserved exclusively for storing metadata, while, in other implementations, the metadata eraseblocks may store both metadata and application data. Additionally or alternatively, in some implementations, fewer or more than four eraseblocks in each bank of asymmetric memory may be configured to store metadata associated with the other eraseblocks in the bank of asymmetric memory. Furthermore, in some cases, the eraseblocks configured to store metadata may be located in positions other than, or in addition to, the first two physical erase blocks within a bank of asymmetric memory and the last two physical erase blocks within the bank of asymmetric memory.

A variety of different types of metadata may be stored in the metadata eraseblocks. For example, with respect to Bank 1 510, the metadata eraseblocks in Bank 1 510 may store metadata that chronicles write operations that have been performed on the various different physical eraseblocks within Bank 1 510. More particularly, for each of several write operations performed on physical eraseblocks within Bank 1 510, the metadata eraseblocks in Bank 1 510 may store metadata that identifies the relative time at which the write operation was performed, the physical eraseblock on which the write operation was performed, the particular logical volume and, more particularly, the logical eraseblock within the particular logical volume to which the data written to the physical eraseblock corresponds, and the number of times the physical eraseblock on which the write operation was performed has been erased.

As discussed above, a volume information table (not shown) (or memory map, database, or similar structure) stored, for example, in volatile main memory, may be used to keep track of the physical erase blocks that currently store data associated with each of the logical eraseblocks of a particular logical volume. In the event that the volume information table for the particular logical volume needs to be recreated (e.g., upon powering on the system), the metadata distributed across the various banks of asymmetric memory system 500 may be accessed and used to recreate the volume information table for the particular logical volume. For example, in some implementations, all of the metadata eraseblocks (or, alternatively, some subset of the metadata eraseblocks) distributed across the various banks of asymmetric memory system 500 may be scanned to determine which physical eraseblocks within the asymmetric memory system 500 include the most recent data for each of the logical eraseblocks of the particular logical volume, and the volume information table may be recreated by recording which physical eraseblocks within the asymmetric memory system were determined to include the most recent data for each of the logical eraseblocks of the particular logical volume. In the event that the eraseblock metadata identifies multiple physical eraseblocks as corresponding to the same logical eraseblock, the physical eraseblock that includes the most recent data for the logical eraseblock may be identified based on the eraseblock metadata that identifies the relative times at which the physical eraseblocks were written.

Furthermore, because the eraseblock metadata may track the number of times that individual physical eraseblocks have been erased, the eraseblock metadata also may enable the intelligent identification and subsequent selection of physical erase blocks to erase and write to such that the different physical eraseblocks are utilized at more or less the same frequency, thereby leveling wear across the asymmetric memory system 500.

In contrast to storing all (or a majority) of the metadata that chronicles write operations that have been performed on various different physical eraseblocks of an asymmetric memory system in one, centralized location, the metadata that chronicles write operations that have been performed on the various different physical eraseblocks of the asymmetric memory system 500 illustrated in FIG. 5 may be said to be distributed across the asymmetric memory system 500 because the eraseblock metadata is stored in multiple different eraseblocks scattered across multiple different banks of the asymmetric memory subsystem 500.

Distributing the eraseblock metadata across the different banks of the asymmetric memory system 500 in this manner may enable more efficient management of the metadata than storing all of the metadata in one, centralized location on the asymmetric memory system 500. For example, if application data is to be written to a physical eraseblock located in Bank 1 510 of the asymmetric memory system 500 and all of the metadata were stored in Bank 2 520 of the asymmetric memory system 500, both Bank 1 510 and Bank 2 520 would experience disruptions as a consequence of writing the application data to the physical eraseblock, because a first write operation would have to be performed on Bank 1 510 to write the application data to the physical eraseblock and a second write operation would have to be performed on Bank 2 520 to update the metadata to record the logical eraseblock and volume to which the application data written to the physical eraseblock corresponds. In contrast, when the metadata is distributed across different banks of the asymmetric memory system 500, the metadata associated with a physical eraseblock that is being written to is written to the same bank as the physical eraseblock that is being written to. Therefore, the metadata can be written at the same time that the application data is written to the physical eraseblock, causing only one bank to be impacted as a consequence of writing the application data to the physical eraseblock and thereby leaving a larger portion of the asymmetric memory system 500 available for read operations while the application data is being written to the physical eraseblock.

Metadata eraseblocks may be located at fixed locations within the banks of an asymmetric memory system. For example, as illustrated in FIG. 5, the metadata eraseblocks are located in the first two eraseblocks of each bank of the asymmetric memory system and the last two eraseblocks of each bank of the asymmetric memory system. In such implementations, the first two metadata eraseblocks of a bank may be used to maintain a first copy of metadata and the last two eraseblocks of the bank may be used to maintain a second copy of the metadata.

In some implementations, the per-block metadata and the volume metadata stored in the asymmetric memory system are stored in predetermined, fixed locations within the metadata eraseblocks. Thus, when a file system operation is performed that results in a change to the file data and/or the volume attributes that needs to be reflected in the metadata stored in the asymmetric memory system, the location within the metadata eraseblocks of the per-block metadata or the volume metadata that needs to be updated is known and can be updated by copying the metadata stored in the metadata eraseblock, updating the metadata stored at the appropriate location within the metadata eraseblock to reflect the change(s) resulting from the file system operation, and writing the metadata, including the updated metadata, to a second metadata eraseblock.

For example, referring to FIG. 5, Eraseblock 1 of Bank 510 may store metadata reflecting the current state of the other physical eraseblocks within Bank 510, and Eraseblock 2 of Bank 510 may be erased and available for a write operation to update the metadata that reflects the state of the other physical eraseblocks within Bank 510. When a write operation is performed on an eraseblock within Bank 510, the location within Eraseblock 1 of the per-block metadata corresponding to the eraseblock to be written to is known, and can be updated by copying the metadata stored in Eraseblock 1, updating the per-block metadata corresponding to the eraseblock to be written to, and writing the metadata, including the updated metadata, to Eraseblock 2 of Bank 510. Thereafter, Eraseblock 1 of Bank 510 may be erased and made available to be written to, to update the metadata that reflects the state of the other physical eraseblocks within Bank 510. In this manner, Eraseblock 1 and Eraseblock 2 may "ping-pong" back and forth between storing the copy of the metadata that reflects the current state of the other physical eraseblocks of Bank 510. Furthermore, Eraseblock N−1 and Eraseblock N may be utilized in a similar fashion to maintain a redundant copy of the metadata that reflects the state of the other physical eraseblocks within Bank 510. Thus, if the copy of the metadata stored in Eraseblocks 1 and 2 of Bank 510 is lost or corrupted, a second copy of the metadata is available from Eraseblocks N−1 and N of Bank 510.

As an alternative to storing the per-block metadata and the volume metadata in predetermined, fixed locations within the metadata eraseblocks of any given bank of the asymmetric memory system, the per-block metadata and the volume metadata may be stored in a log structure within the metadata eraseblocks of the bank such that updates to the per-block metadata and the volume metadata for the bank are written to the metadata eraseblocks in a sequential fashion. Generally, the write characteristics of asymmetric memory systems enable in-place writes to be performed to a physical block of the asymmetric memory system when data is written sequentially to the next available location within the physical block. Thus, structuring the metadata in the form of a log enables the system to take advantage of the ability to perform sequential, in-place writes to a metadata eraseblock instead of having to erase the entire eraseblock each time it is desired to update the metadata recorded in the metadata eraseblock. In such implementations where the metadata stored in the asymmetric memory component is structured in the form of a log, the next available location within each metadata eraseblock may be maintained in main memory and updated whenever a new log entry is written.

In some implementations, each update to a log is written to the next available location within a metadata eraseblock as a log entry that includes a sequence number, a checksum, and a type. After a log entry has been written to a log, the checksum enables verification that the log entry is in fact valid when, for example, the log is being accessed to rebuild the metadata stored in main memory. In the event that the checksum reveals that the log entry is not valid, the log entry may be skipped, or, accessed from a duplicate copy of the log, if a duplicate copy of the log is available.

Various different types of log entries may be available, including, for example, log data block header entries, volume attribute entries, per-block volume information entries, and/or per-block erase information entries. A log data block header entry may appear at the start of the log in each metadata eraseblock. The log data block may indicate that the block is being used to store metadata and the log data block may identify the starting sequence number of the entries in the log. A volume attribute entry in a log generally records information about the volume being referred to and one or more attributes of the volume (e.g., file size, file owner, etc.). A per-block volume information entry in a log generally records information about a physical block in the same bank of asymmetric memory that has been assigned to a corresponding logical volume including, for example, the physical block number, the corresponding volume ID, the offset within the corresponding volume, and/or information about the volume type, the type of the block, etc. A per-block erase information entry generally records information about physical blocks in the bank of asymmetric memory that are unassigned to a logical volume including, for example, the physical block number, its erase count, and/or an indication that the block has been damaged and should not be utilized. As will be described in greater detail below, in some implementations, per-block volume information and per-block erase information may be combined into a single log entry.

In implementations where metadata stored in a bank of an asymmetric memory component is maintained in the form of a log, it is conceivable that the size of the log eventually may outgrow the memory capacity of the metadata eraseblock(s) in which the log is stored. Therefore, various different techniques may be employed to prevent a log from outgrowing the memory capacity of the metadata eraseblock(s) in which it is stored. For example, in one implementation, since it may be possible to estimate the number of erase operations that an asymmetric memory system can withstand during its lifetime, the memory space allocated for the log may be selected such that it is highly unlikely that the allocated memory space will be exceeded before the asymmetric memory system fails.

Additionally or alternatively, when the log grows close to outgrowing the memory capacity of the metadata eraseblock(s) in which it is stored, the log may be maintained in a first-in-first-out fashion such that each time a new entry is added to the log, the oldest entry in the log is deleted from the log.

In other implementations, garbage collection techniques may be employed on the log on a periodic, event-triggered, or random basis to prevent the log from outgrowing its reserved memory space. For instance, garbage collection may be performed on the log in response to a determination that the log exceeds a threshold percentage of its reserved capacity. In some implementations, garbage collection may be facilitated by utilizing two or more metadata eraseblocks to maintain a log.

For example, referring to FIG. 5, Eraseblock 1 of Bank 510 may store a log that reflects the current state of the other physical eraseblocks within Bank 510, and eraseblock 2 of Bank 510 may be erased and available to receive data from a write operation. When the log stored in Eraseblock 1 of Bank 510 is determined to exceed some predefined, threshold capacity of Eraseblock 1, the metadata stored in the log is collapsed and then the smaller, collapsed log is written to Eraseblock 2 of Bank 510, where the log can again be written to in a sequential, in-place fashion.

In some implementations, the process of collapsing the log involves removing one or more outdated or redundant entries from the log by identifying multiple entries corresponding to the same logical volume and offset and deleting all but the most recent entry corresponding to the logical volume and offset. For example, if a log stored in a bank of asymmetric memory includes a first entry that indicates that physical block 5 of the bank of asymmetric memory stores application data corresponding to volume 3's logical offset 2 and a second, more recent entry that indicates that physical block 7 of the bank of asymmetric memory stores application data corresponding to volume 3's logical offset 2, the first entry can be determined to be outdated due to the existence of the second, more recent log entry. Therefore, when the log is collapsed, the first entry is deleted from the log, thereby resulting in the log being collapsed to a smaller size.

After the log has been collapsed and the resultant, smaller version of the log has been written to Eraseblock 2 of Bank 510, Eraseblock 1 may be erased so that it is available when the log eventually grows to reach a predefined, threshold capacity of Eraseblock 2 of Bank 510. When the log is determined to exceed this predefined, threshold capacity of Eraseblock 2, it is collapsed again and the resultant, smaller version of the log is rewritten to Eraseblock 1 of Bank 510, where it can again be written to in a sequential, in-place fashion. In this manner, Eraseblock 1 and Eraseblock 2 of Bank 510 may "ping-pong" back and forth between storing the copy of the log. Furthermore, Eraseblock N–1 and Eraseblock N also may be utilized in a similar fashion to maintain a redundant copy of the log. Thus, if the copy of the log stored in Eraseblocks 1 and 2 of Bank 510 is lost or corrupted, a second copy of the log is available from Eraseblocks N–1 and N of Bank 510.

In still other implementations, two or more copies of the log may be maintained in the bank, thereby enabling a first copy of the log to be taken offline while garbage collection is performed on it, while the second copy of the log remains available to be updated or accessed despite the first copy of the log being unavailable.

Figure 6:
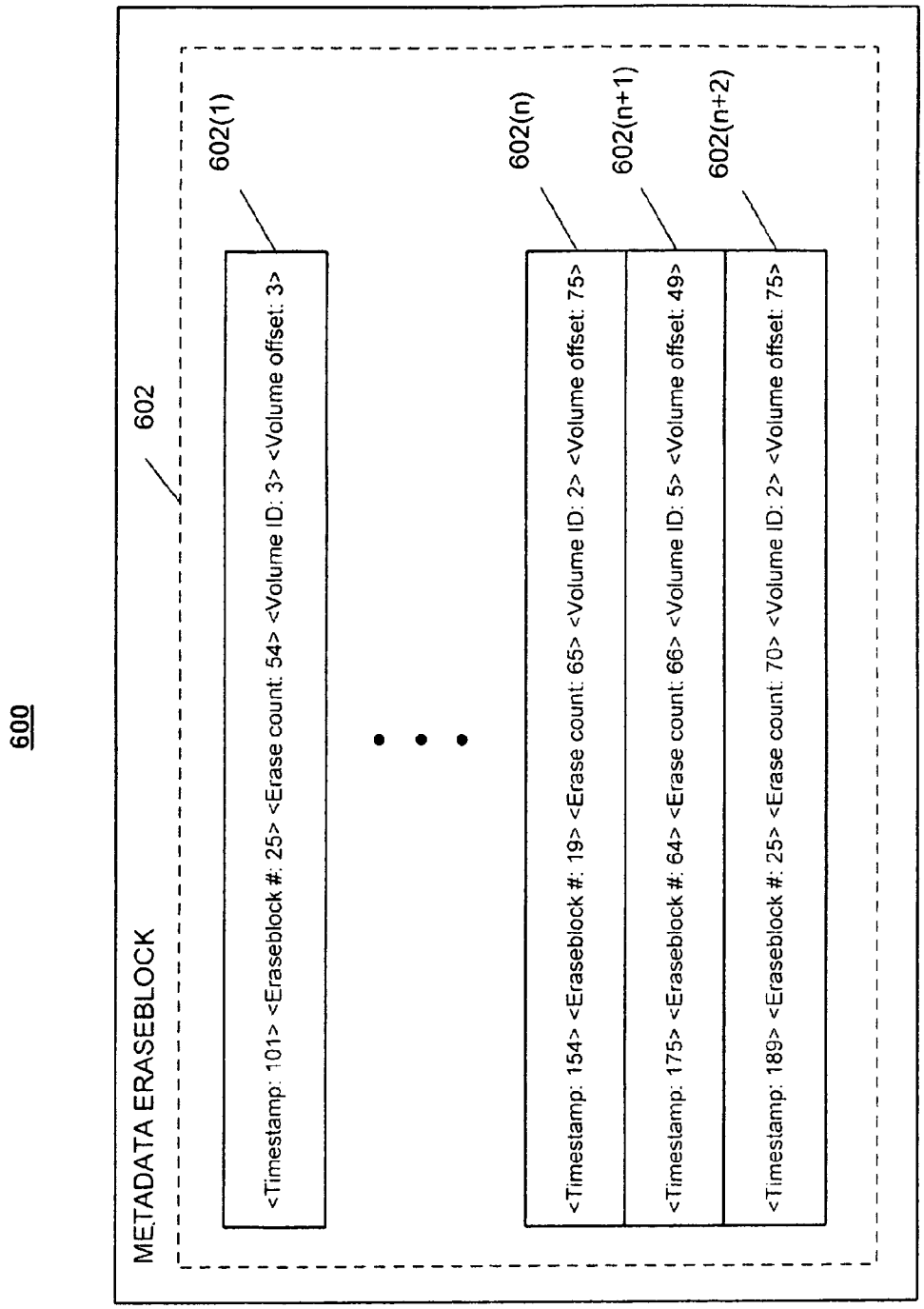
FIG. 6 is a block diagram of an example of a metadata eraseblock for a bank of asymmetric memory that stores eraseblock metadata associated with individual physical eraseblocks within the bank of asymmetric memory in a log.

FIG. 6 is a block diagram of an example of a metadata eraseblock 600 for a disruption region (not shown) within an asymmetric memory system (not shown) that stores metadata associated with individual physical eraseblocks within the disruption region in the form of a log 602. As illustrated in FIG. 6, the metadata eraseblock includes a log 602 having multiple eraseblock metadata entries 602(1) . . . 602(n+2), each of which includes information about write operations performed on physical erase blocks within the disruption region. More particularly, each metadata entry corresponds to a write operation that was performed on a physical erase block within the disruption region and includes a "Timestamp" field that identifies a relative time at which the write operation occurred, an "Eraseblock #" field that identifies the address of the physical eraseblock on which the write operation was performed, an "Erase count" field that identifies the number of times that the physical eraseblock on which the write operation was performed has been erased, a "Volume ID" field that identifies the logical volume with which the write operation performed on the physical eraseblock identified in the "Eraseblock #" field is associated, and a "Volume offset" field that identifies the particular logical eraseblock within the logical volume identified in the "Volume ID" field with which the write operation performed on the physical eraseblock identified in the "Eraseblock #" field is associated.

For the purposes of illustration, assume that metadata eraseblock 600 is associated with a disruption region in an asymmetric memory component that includes 100 physical eraseblocks that are addressed using a number between 1 and 100, that application data associated with five different logical volumes is stored in the asymmetric memory system to which the disruption region belongs, and that each logical volume includes 100 logical eraseblocks.

Then, log entry 602(1) indicates that the write operation associated with log entry 602(1) occurred at a relative time of 101 and was performed on physical eraseblock 25 of the disruption region which, after the write operation, has been erased 54 times. In addition, log entry 602(1) indicates that the application data written to physical eraseblock 25 during the write operation associated with log entry 602(1) corresponds to the third logical eraseblock of the third logical volume.

Similarly, log entry 602(n) indicates that the write operation associated with log entry 602(n) occurred at a relative time of 154 and was performed on physical eraseblock 19 which, after the write operation, has been erased 65 times. In addition, log entry 602(n) indicates that the application data written to physical eraseblock 19 during the write operation associated with log entry 602(n) corresponds to the seventy-fifth logical eraseblock of the second logical volume.

Like log entry 602(n), log entry 602(n+2) indicates that the application data written during the write operation associated with log entry 602(n+2) corresponds to the seventy-fifth logical eraseblock of the second logical volume. However, in contrast to log entry 602(n), log entry 602(n+2) indicates that the write operation associated with log entry 602(n+2) was performed on physical eraseblock 25. Therefore, log entry 602(n) and log entry 602(n+2) may appear to suggest that both physical erase block 19 and physical eraseblock 25 correspond to the seventy-fifth logical eraseblock of the second logical volume. However, log entry 602(*n*) indicates that the write operation associated with log entry 602(*n*) occurred at relative time 154 and the write operation associated with log entry 602(*n*+2) occurred at relative time 189. Therefore, it can be determined that the write operation associated with log entry 602(*n*+2) occurred after the write operation associated with log entry 602(*n*) and, therefore, that physical eraseblock 25—not physical eraseblock 19—currently corresponds to the seventy-fifth logical eraseblock of the second logical volume because physical eraseblock 25 was written to more recently than physical eraseblock 19.

Further inspection of log 602 reveals that log entry 602(1) and log entry 602(*n*+2) both are associated with write operations that were performed on physical eraseblock 25, but that the write operation associated with log entry 602(1) corresponds to the third logical eraseblock of the third logical volume, while the write operation associated with log entry 602(*n*+2) corresponds to the seventy-fifth logical eraseblock of the second logical volume. Therefore, log entries 602(1) and 602(*n*+2) may appear to suggest that physical eraseblock 25 stores application data that corresponds to the third logical eraseblock of the third logical volume as well as the seventy-fifth logical eraseblock of the second logical volume. However, log entry 602(1) indicates that the write operation associated with log entry 602(1) occurred at relative time 101 while the write operation associated with log entry 602(*n*+2) occurred at relative time 189. Therefore, because the write operation associated with log entry 602(*n*+2) occurred after the write operation associated with log entry 602(1), it can be determined that physical eraseblock 25 currently corresponds to the seventy-fifth logical eraseblock of the second logical volume, not the third logical eraseblock of the third logical volume.

The disruption region to which the metadata eraseblock 602 corresponds may be just one of several disruption regions that collectively constitute an asymmetric memory system. As such, application data associated with the five different logical volumes may be stored in various different physical eraseblocks distributed across various different disruption regions within the asymmetric memory system, and volume information tables stored, for example, in volatile main memory, may be used to track the relationship between the logical eraseblocks of the five different logical volumes and the physical erase blocks in the asymmetric memory system to which the logical eraseblocks of the five different logical volumes correspond.

In addition, each disruption region of the asymmetric memory system may include one or more metadata eraseblocks that, like metadata eraseblock 602, are configured to store metadata for individual physical eraseblocks within the disruption region that records the logical volumes and, more particularly, the particular logical eraseblocks within the logical volumes, to which the physical eraseblocks within the disruption region correspond. When taken together, the metadata eraseblocks distributed across the different disruption regions may store all of (or at least a sufficient number of) the relationships between the logical eraseblocks of the five different logical volumes and the physical erase blocks to which the logical eraseblocks of the five different logical volumes correspond, such that the volume information tables for one or more of the five different logical volumes can be recreated, if need be, by accessing the metadata distributed across the various different disruption regions of the asymmetric memory system.

As illustrated in FIG. 6, whole number integers are used to designate the relative times at which write operations are performed. Each time a new write operation is performed, the whole number integer used to designate the immediately preceding write operation is incremented by one and associated with the new write operation. As such, it is possible to determine when the write operations were performed relative to each other because the higher a whole number integer associated with a write operation, the more recently the write operation was performed. Of course, the relative times at which write operations are performed can be designated in a variety of different manners. For example, any monotonically increasing series or sequence of numbers may be used to designate the relative times at which write operations are performed. Alternatively, the actual physical dates and/or times at which write operations are performed may be used to designate the relative times at which write operations are performed. In fact, any designation that enables the relative order in which write operations are performed to be determined may be used to designate the relative times at which the write operations are performed.

Writing and storing metadata associated with individual physical eraseblocks within a disruption region in the form of a log may enable the efficient storage and writing of the metadata. In order to write to a sector within an eraseblock of asymmetric memory, many asymmetric memory configurations require that a block write be performed in which the entire eraseblock is copied, erased, and rewritten with the updated sector, unless sectors within an eraseblock are being written to in a sequential fashion. When sectors within an eraseblock are written to in a sequential fashion, many asymmetric memory configurations enable in-place writes which generally are faster and cause less disruption than block writes. When eraseblock metadata is written and stored in the form of a log, a new entry may be added to the log by writing to the next available sector in the eraseblock within which the log is stored. Therefore, the new entry may be added to the log using an in-place write, rather than requiring a block write. Therefore, the new entry may be added to the log relatively quickly and without causing much disruption.

As discussed above, volume metadata also may be stored for each logical volume stored in an asymmetric memory system. Among other features, the volume metadata for an individual logical volume may record the name, size, and creation time of the individual logical volume. In addition, if the individual logical volume ever is extended, the volume metadata for the individual logical volume also may record the time at which the individual logical volume was extended.

FIG. 7 is a block diagram of a volume metadata structure 700 that stores volume metadata for an individual logical volume that is stored in an asymmetric memory system. In some implementations, volume metadata for an individual logical volume may be stored in one or more physical eraseblocks of an asymmetric memory system. As illustrated in FIG. 7, the volume metadata structure 700 includes a "Name" field that identifies the volume metadata as corresponding to logical volume number four, a "Size" field that identifies that logical volume number four currently includes one hundred logical eraseblocks, a "Creation Date" field that indicates that logical volume number four was created on Date 1, and an "Extension Date" that indicates that logical volume number four was created on Date 2. In the event that logical volume number four is extended again, the volume metadata stored in volume metadata structure 700 may be updated to reflect the date of the extension as well as the size of logical volume number four following the extension. Similarly, if logical volume number four is decreased, the volume metadata stored in volume metadata structure 700 may be updated to reflect the date of the decrease as well as the size of logical volume number four following the decrease.

Figure 8:
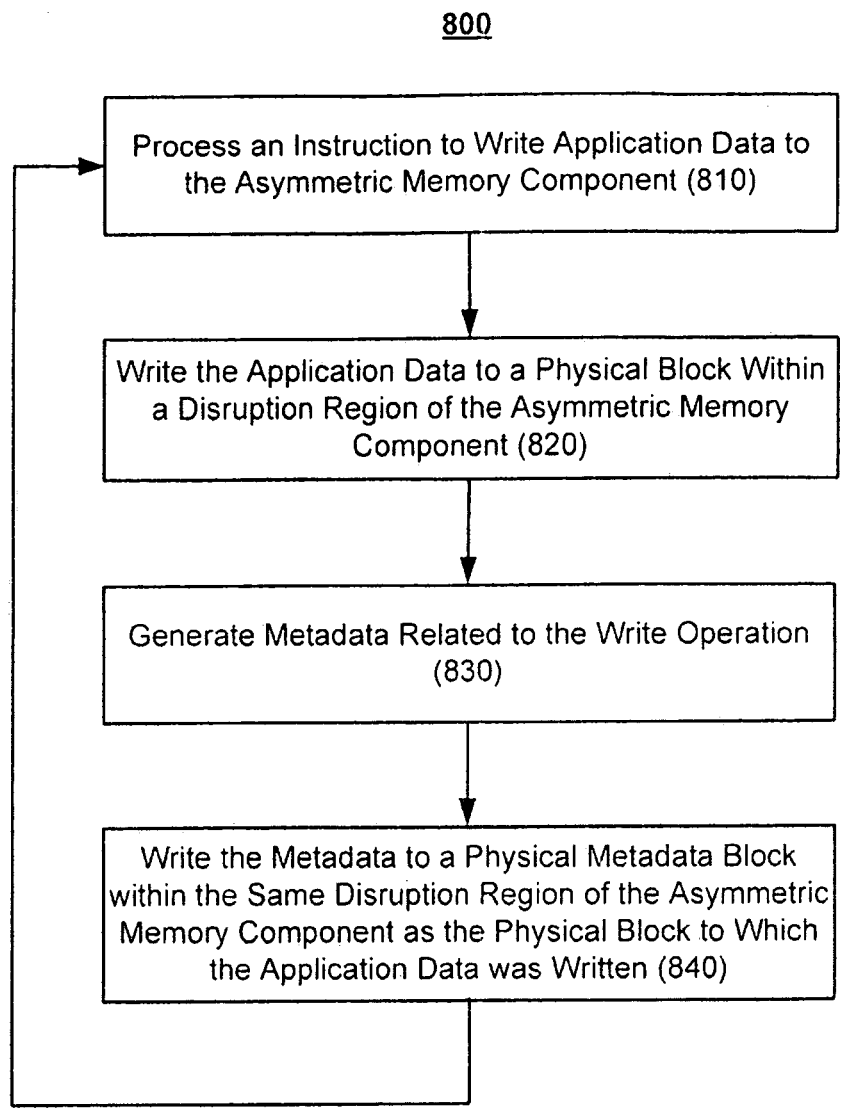
FIGS. 8 and 9 are flowcharts of examples of processes for performing write operations on asymmetric memory systems.

FIG. 8 is a flowchart 800 of an example of a process for performing write operations on an asymmetric memory system, such as, for example, an asymmetric memory system that is being used as secondary storage for storing a file system. As described above, the asymmetric memory system may include multiple disruption regions (e.g., banks of asymmetric memory components) and each disruption region may have one or more physical blocks that are configured to store metadata related to write operations that are performed on the other physical blocks of the disruption region. For example, in some implementations, the first two physical blocks of each disruption region may be reserved for storing metadata related to write operations performed on the other physical blocks of the disruption region.

The process begins by processing an instruction to write application data to the asymmetric memory component (810). For example, a memory controller, such as, for example, memory controller 208A of FIG. 2A and/or memory controller 230B of FIG. 2B, may receive a request to write application data to a particular logical block of a logical volume within the file system. In response, the memory controller may translate the request to write the application data to the particular logical block of the logical volume into a request to write the application data to a particular physical block within a particular disruption region of the asymmetric memory component.

Thereafter, the application data is written to the particular physical block within the particular disruption region of the asymmetric memory system (820). As a consequence of writing to the particular physical block within the particular disruption region, the entire disruption region may become temporarily unavailable for read operations due to the disruptive nature of performing write operations on asymmetric memory.

In addition to writing the application data to the particular physical block within the particular disruption region, metadata related to the write operation is generated (830). For example, the logical block and the logical volume that correspond to the application data written to the particular physical block may be determined. Additionally or alternatively, a relative time at which the write operation was performed also may be determined. For instance, the write operation may be assigned a number within a monotonically increasing series that identifies when the write operation was performed relative to other write operations and/or the actual physical date and/or time at which the write operation was performed may be determined. The number of times that the particular physical block that was written to has been erased also may be determined.

After the metadata related to the write operation is generated, the metadata is written to a physical block within the same disruption region as the particular physical block to which the application data was written (840). Writing the metadata to a physical block within the same disruption region as the particular physical block to which the data was written enables the metadata to be recorded without causing a disruption to a second disruption region of the asymmetric memory system, because the metadata can be written at the same time that the application data is written. In contrast, if the metadata were written to a different disruption region than the bank of asymmetric memory to which the application data was written, then two disruption regions would be disrupted as a consequence of the write operation.

In some implementations, the metadata may be written to one or more physical blocks in the disruption region that are reserved exclusively for storing metadata. Additionally or alternatively, the metadata may be written to and stored within one or more physical blocks in the disruption region in the form of a log. Writing new metadata as a new entry in a log may enable the metadata to be written quickly and efficiently because an in-place write, as opposed to a block write, may be performed to write the new metadata to the log.

The process illustrated in FIG. 8 may be repeated as application data corresponding to the logical blocks of the logical volume is updated and/or additional application data is written to logical blocks of the logical volume. For example, a second instruction to write application data to the asymmetric memory component may be processed, resulting in the new application data being written to a different disruption region of the asymmetric memory component. In addition, metadata related to the second write operation may be generated and written to the same disruption region of the asymmetric memory component as the new application data. The result of writing a combination of the application data and corresponding metadata to the same disruption region of the asymmetric memory is that metadata ultimately is distributed across many different disruption regions within the asymmetric memory component.

Figure 9:
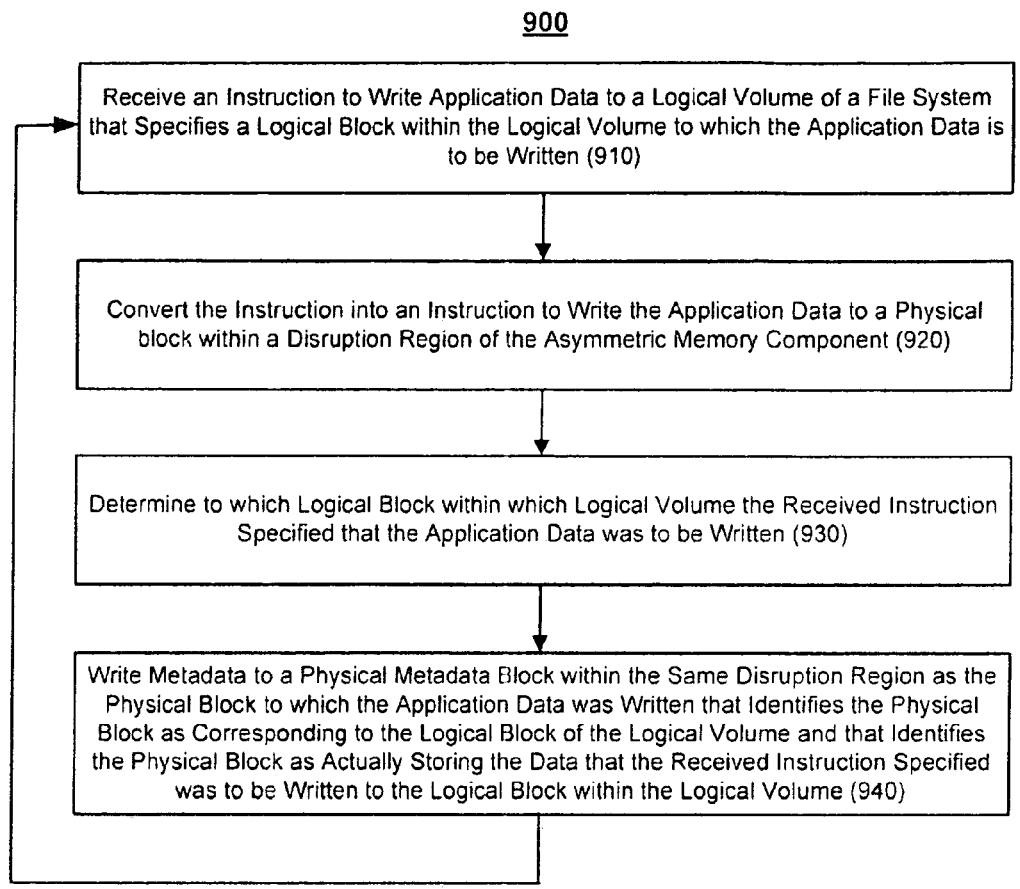

FIG. 9 is a flowchart 900 of a more detailed example of a process for performing write operations on an asymmetric memory system, such as, for example, an asymmetric memory system that is being used as secondary storage. The process begins when an instruction to write application data to a logical volume of a file system that specifies a particular logical block within the logical volume to which the application data is to be written is received (910). In some implementations, the instruction to write application data to the logical volume may specify the particular logical block within the logical volume to which the data is to be written by specifying the particular logical block's offset within the logical volume. In response to receiving the instruction to write the application data, the instruction is converted into an instruction to write the application data to a particular physical block within a particular disruption region of the asymmetric memory system (920). For example, a memory controller, such as, for example, memory controller 208A of FIG. 2A and/or memory controller 230B of FIG. 2B, may receive the instruction to write application data to the logical volume that specifies the particular logical block within the logical volume to which the application data is to be written and convert the instruction into an instruction to write the application data to a particular physical block within a particular disruption region of the asymmetric memory component.

In addition, a determination is made as to which logical block within which logical volume the received instruction specified that the application data was to be written (930). Thereafter, metadata that identifies that the particular physical block to which the data was written corresponds to the particular logical block and stores the application data that the received instructions specified was to be written to the particular logical block is written to a physical metadata block within the same disruption region of the asymmetric memory system as the particular physical block to which the data was written (940). As discussed above, the metadata may be written to the physical metadata block as an in-place write which may enable the metadata to be written more quickly and efficiently than if it was written as a block write. In addition, writing the metadata to the same disruption region of the asymmetric memory system as the particular physical block to which the application data was written prevents two banks of asymmetric memory from being disrupted, as would be the case if the metadata was written to a different disruption of the asymmetric memory system than the application data.

The process illustrated in FIG. 9 may be repeated several times to update old data and to write new data to the asymmetric memory component. Each time application data is written to the asymmetric memory system, metadata related to the application data is generated and written to the same disruption region of the asymmetric memory system as the application data.

In some implementations, a volatile main memory component may maintain a volume information table that maps all (or at least some portion) of the logical blocks of the logical volume to their corresponding physical blocks in the asymmetric memory system. In other implementations, a non-volatile memory component or a hybrid combination of volatile and non-volatile memory components may maintain the volume information table. When data is written to physical blocks of the asymmetric memory system, the volume information table may be updated to reflect which physical blocks of the asymmetric memory system correspond to which logical blocks. In the event that the volume information table is compromised and therefore needs to be recreated, the metadata distributed across different metadata blocks within different disruption regions of the asymmetric memory system may be used to recreate the volume information table.

FIG. 10 is a flowchart 1000 of an example of a process for recreating a volume information table that tracks relationships between logical blocks of a logical volume and physical blocks of an asymmetric memory system based on metadata that is distributed across multiple different disruption regions (e.g., banks of asymmetric memory) within the asymmetric memory system. As described above, when a write operation is performed on a physical block within a disruption region, metadata that identifies the logical block to which the write operation corresponds and a relative time (e.g., time stamp or sequence number) at which the write operation was performed may be written to a metadata block in the same disruption region within the asymmetric memory system. Due to the fact that application data for one logical volume may be written to multiple different disruption regions within the asymmetric memory system, metadata for the logical volume may be distributed across multiple different disruption regions within the asymmetric memory system.

A volume information table that maps individual logical blocks of a logical volume to the individual physical blocks of an asymmetric memory component that store the application data associated with the individual logical blocks of the logical volume is maintained in a volatile memory component (1010). For example, the volume information table may be maintained in DRAM in main memory.

At some point, it is determined that the volume information table needs to be recreated (1020). For example, the system may be powered down, and, consequently, the volume information table may be lost due to the fact that it was maintained in volatile memory. Therefore, when the system subsequently is powered on, it may be determined that the volume information table needs to be recreated. Other events also may trigger a determination that the volume information table needs to be created. For example, a system crash or similar catastrophic event may cause the volume information table to be lost, or data stored in the volume information table may be corrupted over time.

Because the metadata distributed across the different disruption regions of the asymmetric memory system records the logical blocks to which write operations performed on the physical blocks of the different disruption regions of the asymmetric memory system correspond as well as the relative times at which write operations were performed on the physical blocks of the different disruption regions, it is possible to determine the physical block that stores the most recent data for each logical block. As a result, it is possible to recreate the volume information table based on the metadata that is distributed across the different disruption regions of the asymmetric memory system.

Therefore, in response to determining that the volume information table needs to be recreated, the metadata for the logical volume is accessed from the metadata blocks that are distributed across the various different banks of asymmetric memory (1020), and, for each of multiple individual logical blocks of the logical volume, it is determined which physical data block that the metadata identifies as storing data associated with the logical block was written to most recently (1025).

For example, all of the metadata entries that identify write operations that were performed on the same physical data block within the asymmetric memory component may be compared, and the metadata entry having the most recent timestamp or sequence number may be determined to be the metadata entry that identifies the present state of the physical block. In the event that only one metadata entry identifies a write operation performed on the physical data block, that metadata entry may be assumed to correctly identify the present state of the physical block.

Additionally or alternatively, all of the metadata entries that identify write operations corresponding to the same logical block may be compared, and the metadata entry having the most recent timestamp or sequence number may be determined to be the metadata entry that correctly identifies the physical block within the asymmetric memory system that presently corresponds to the logical block. In the event that only one metadata entry identifies a write operation corresponding to the logical block, the metadata entry may be assumed to correctly identify the physical block that presently corresponds to the logical block.

After the various different metadata blocks distributed across the different disruption regions of the asymmetric memory component have been scanned and the metadata has been used to determine the present relationships between the different logical blocks and the physical blocks of the asymmetric memory system, the volume information table is recreated by configuring the volume information table to map individual logical blocks of the logical volume to the physical data blocks of the asymmetric memory system to which the logical blocks presently correspond (1030).

In some implementations, the entire volume information table may not be rebuilt all at once following a determination that the volume information table needs to be rebuilt. Rather, file and volume objects may be identified in response to determining that the volume information table needs to be rebuilt, but the identification of the constituents of the file and volume objects may be delayed until a later time (e.g., when a request to access the file is received and processed). In this manner, portions of the volume information table may be said to be rebuilt in an "on-demand" fashion.

The ability to rebuild the volume information table in such an on-demand fashion may be based on the observation that, given typical usage patterns where blocks of a file tend to be written as a group, it is possible to infer whether or not the latest metadata for all of the blocks of a file exist in the volume information table in main memory. In particular, the metadata blocks in each disruption region of the asymmetric memory system first may be scanned to determine the earliest and latest time stamps or sequence numbers recorded in each metadata block. Then, when a request to access a particular file is received and processed, the metadata blocks are scanned, starting from the first disruption region, in order to identify the physical blocks of the asymmetric memory system that correspond to the logical blocks of the particular file. When all of the metadata for a particular file has been retrieved, the scan is stopped. Then, later, when a request to access another file is received and processed, the scan of the metadata blocks resumes where the last scan left off and stops when all of the metadata for the next file has been retrieved.

In addition to enabling the volume information table stored in main memory to be rebuilt, the metadata stored in the asymmetric memory system also can be scanned and used to rebuild the free block information table in main memory.

As described above, metadata eraseblocks distributed across various different disruption regions of an asymmetric memory system may store information related to write operations that have been performed on other physical erase blocks within the disruption region. However, such distributed metadata eraseblocks also may store other metadata associated with the physical eraseblocks located within the same disruption region in addition to information related to write operations that have been performed on the physical erase blocks. For example, distributed metadata eraseblocks may store information related to operations other than (or in addition to) write operations performed on the physical eraseblocks within the same disruption region.

Furthermore, physical eraseblocks in an asymmetric memory system may exist in a variety of different states including erased (i.e., ready to be written), active (i.e., currently written), and pending erase (i.e., not active), and distributed metadata eraseblocks may store information related to the current states of physical erase blocks within the same disruption region. Referring to FIG. 6, in some implementations, the status of a particular physical eraseblock within a disruption region may be reflected by the values assigned to the "Volume ID" and "Volume offset" fields of a metadata entry corresponding to the particular physical eraseblock. For example, a metadata entry that specifies values for the "Volume ID" and "Volume offset" fields that correspond to a valid volume and offset, the metadata entry reflects that the physical eraseblock to which the metadata entry corresponds is active. In contrast, a metadata entry corresponding to a physical eraseblock may reflect that the physical eraseblock is erased and ready to be written or that the physical eraseblock is pending erase by specifying certain reserved values in the "Volume ID" and "Volume offset" fields. For example, if the physical erase block is erased and ready to be written, the "Volume ID" and "Volume offset" fields both may be set equal to "−1." Similarly, if the physical eraseblock is pending erase, the "Volume ID" field may be set to "−1," while the "Volume offset" field is set to a valid value.

Figure 11:
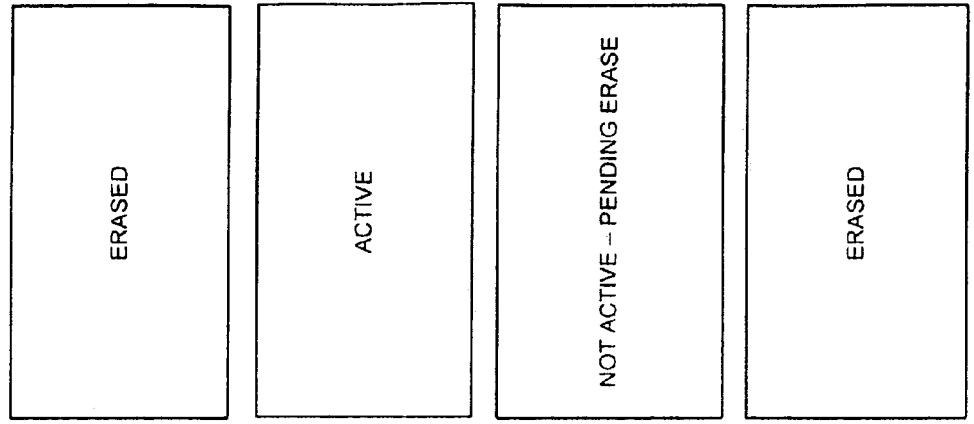
FIG. 11 is a block diagram that illustrates an example of how metadata entries corresponding to a particular physical eraseblock can be used to track the status of the physical eraseblock.

FIG. 11 is a block diagram 1100 that illustrates an example of how metadata entries corresponding to a particular physical eraseblock can be used to track the status of the physical eraseblock. As illustrated in FIG. 11, metadata eraseblock 1 110 stores metadata associated with physical eraseblocks in the same disruption region as metadata eraseblock 1110 in the form of a log. 1115. For example, metadata eraseblock 1110 includes various different log entries that reflect the status of Physical Eraseblock 1 1120 at different times. For the purposes of illustration, a representation of Physical Eraseblock 1 1120 also is presented in FIG. 11 to illustrate the progression of Physical Eraseblock 1 1120 through various different states over time.

As illustrated in FIG. 11, at Time 1, an erase operation is performed on Physical Eraseblock 1 1120 that results in Physical Eraseblock 1 1120 being ready to be written to. Therefore, a log entry is added to metadata eraseblock 1110 that indicates that the erase operation was performed on Physical Eraseblock 1 1120 at Time 1 by specifying the values of the "Volume ID" and "Volume offset" fields as "−1.". Because the metadata eraseblock 1110 includes a log entry indicating that Physical Eraseblock 1 1120 is erased and ready to be written to as of Time 1, the metadata eraseblock 1110 enables Physical Eraseblock 1 1120 to be identified as a physical eraseblock that is available to be written to as of Time 1.

At Time 3, a write operation is performed on Physical Eraseblock 1 1120 that results in Physical Eraseblock entering an active state during which time Physical Eraseblock 1 1120 is not to be updated and/or erased. Therefore, a log entry is added to metadata eraseblock 1110 that indicates that Physical Eraseblock 1 1120 entered an active state at Time 3 by specifying values for the "Volume ID" and "Volume offset" fields as values that correspond to a valid logical volume and offset. Because the metadata eraseblock 1110 includes a log entry indicating that Physical Eraseblock 1 1120 is in an active state as of Time 3, the metadata eraseblock 1110 enables Physical Eraseblock 1 1120 to be identified as a physical eraseblock that is not available to be written to as of Time 3.

At Time 6, a write operation is performed to update the data currently stored in Physical Eraseblock 1 1120. As a consequence of this write operation, the data stored in Physical Eraseblock 1 1120 at Time 6 is copied and updated in accordance with the write operation, and then the updated data is written to a different physical eraseblock. After the data stored in Physical Eraseblock 1 1120 has been copied, Physical Eraseblock 1 1120 is queued for erasure so that it can eventually be rewritten. Therefore, a log entry is added to metadata eraseblock 1110 that indicates that Physical Eraseblock 1 1120 is pending erase as of Time 6 by specifying the value of the "Volume ID" field as "−1" while maintaining a valid value in the "Volume offset" field. Because the metadata eraseblock 1110 includes a log entry indicating that Physical Eraseblock 1 1120 is pending erase as of Time 6, the metadata eraseblock 1110 enables Physical Eraseblock 1 1120 to be identified as a physical eraseblock that is pending erase and therefore not available to be written to as of Time 6.

At Time 9, the erase operation for which Physical Eraseblock 1 1120 was queued at Time 6 is performed on Physical Eraseblock 1 1120. As a consequence of the erase operation, Physical Eraseblock 1 1120 is made available to be written to once again. Therefore, a log entry is added to metadata eraseblock 1110 that indicates that the erase operation was performed on Physical Eraseblock 1 1120 at Time 4 by specifying values for the "Volume ID" and "Volume offset" fields as "−1." In addition, the erase count field in the log entry also has been incremented by one to reflect that Physical Eraseblock 11120 has been erased an additional time. Because the metadata eraseblock 1110 includes a log entry indicating that Physical Eraseblock 1 1120 has been erased as of Time 9, the metadata eraseblock 1110 enables Physical Eraseblock 1 1120 to be identified as a physical eraseblock that is available to be written to once again as of Time 9.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a computer-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Other implementations are within the scope of the claims. For example, other useful implementations can be achieved if steps of the disclosed techniques are performed in a different order and/or if components in the disclosed systems are combined in a different manner and/or replaced or supplemented by other components. Furthermore, while the described systems, methods, and techniques generally have been described in the context of an asymmetric memory system that is used both as secondary storage and as main memory (perhaps in connection with a symmetric memory system), the described, systems, methods, and techniques are equally applicable to an asymmetric memory system used exclusively as secondary storage or an asymmetric memory system used exclusively as main memory. Accordingly, other implementations are within the scope of the following claims.

What is claimed is:

1. A method of distributing metadata that corresponds to application data for a file system across multiple different physical disruption regions of asymmetric memory within a module of main memory of a computer system such that metadata is written in the same physical disruption region of the asymmetric memory as the application data to which the metadata corresponds, where individual physical disruption regions of the asymmetric memory include physical blocks and are configured such that writing to a physical disruption region of the asymmetric memory affects the availability of other physical blocks within the same physical disruption region of the asymmetric memory, the method comprising:

performing a first block write operation that writes a first block of application data to a first physical disruption region of the asymmetric memory within the module of main memory;

during the first block write operation in which physical blocks within the first physical disruption region are unavailable, enabling random access read operations to a second physical disruption region of the asymmetric memory within the module of main memory that is different than the first physical disruption region of the asymmetric memory within the module of main memory;

performing a second block write operation that writes a second block of application data that is different than the first block of application data to the second physical disruption region of the asymmetric memory within the module of main memory, the first and second blocks of application data corresponding to first and second logical blocks of the file system respectively;

generating a first block of metadata that that maps logic blocks utilized by the file system to physical blocks of the first physical disruption region to which the first block of application data has been written and generating a second block of metadata that that maps logic blocks utilized by the file system to physical blocks of the second physical disruption region to which the second block of application data has been written;

writing the first block of metadata to the first physical disruption region of the asymmetric memory as part of the first block write operation and writing the second block of metadata to the second physical disruption region of the asymmetric memory as part of the second block write operation such that the first and second blocks of metadata are written to the same physical disruption regions of the asymmetric memory as the blocks of application data to which they correspond, the first block of metadata and the first block of application data are written to different physical blocks in an interleaved manner such that the first block of metadata occupies both the first physical block and the last physical block within the first physical disruption region, the second block of metadata and the second block of application data are written to different physical blocks in an interleaved manner such that the second block of metadata occupies both the first physical block and the last physical block within the second physical disruption region;

during the second block write operation in which physical blocks within the second physical disruption region are unavailable, enabling random access read operations to the first physical disruption region of the asymmetric memory within the module of main memory such that data from the first block of application data and the first block of metadata is available for random access reading while the second block write operation is being performed;

receiving an instruction to update the first logical block of the file system with a third block of application data while the first physical disruption region is under random access read operations, the third block of application data being different than the first block of application data and the second block of application data;

based on the instruction to update the first logical block of the file system with the third block of application data, determining to write the third block of application data to the second physical disruption region of the asymmetric memory within the module of main memory;

based on the determination to write the third block of application data to the second physical disruption region of the asymmetric memory within the module of main memory, performing a third block write operation that writes the third block of application data to the second physical disruption region of the asymmetric memory within the module of main memory such that the third block write operation commences while the data from the first block of application data and the first block of metadata from different physical blocks within the first physical disruption region of the asymmetric memory is available for random access reading;

generating a third block of metadata that corresponds to the third block of application data, that identifies the third block of application data-written to physical blocks of the second physical disruption region-as corresponding to the first logical block of the file system, and that indicates the third block of application data as being valid;

writing the third block of metadata to physical blocks within the second physical disruption region of the asymmetric memory as part of the third block write operation such that the third block of metadata is written to the same physical disruption region of the asymmetric memory as the third block of application data to which it corresponds, the third block of metadata and the third block of application data are written to different physical blocks in an interleaved manner such that the third block of metadata occupies both the second physical block and the second-to-last physical block within the second physical disruption region; and updating the first block of metadata by updating the first physical block within the first physical disruption region to which the first block of metadata has been written to indicate the first block of application data as being invalid.

2. A method of writing application data to a memory storage system that includes an asymmetric memory component having multiple physical disruption regions such that metadata related to a write operation performed to write application data to an individual physical disruption region of the asymmetric memory component is written to the same individual disruption region of the asymmetric memory component as the application data, where individual physical disruption regions of the asymmetric memory component include one or more physical blocks, and where individual physical disruption regions of the asymmetric memory component are configured such that writing to a physical block within a physical disruption region of the asymmetric memory component affects the availability of other physical blocks within the same physical disruption region of the asymmetric memory component, the method comprising:

receiving a first instruction to write a first quantum of application data to a logical volume, the first instruction specifying a first logical block within the logical volume to which the first quantum of application data is to be written;

converting the first instruction to write the first quantum of application data to the first logical block within the logical volume into a second instruction to write the first quantum of application data to a specified physical block within a first physical disruption region of the asymmetric memory component;

processing the second instruction to write the first quantum of application data to the specified physical block within the first physical disruption region of the asymmetric memory component;

in response to processing the second instruction to write the first quantum of application data to the specified physical block within the first physical disruption region of the asymmetric memory component, performing a first write operation that includes:
  generating first metadata that maps logic blocks within the logical volume to the specified physical block within the first physical disruption region to which the first write operation is directed, the first metadata indicating that the specified physical block within the first physical disruption region of the asymmetric memory component is valid, and
  writing the first quantum of application data and the first metadata related to the first write operation to different physical blocks within the first physical disruption region of the asymmetric memory component such that the first quantum of application data and the first metadata related to the first write operation both are written to the same physical disruption region of the asymmetric memory component in an interleaved manner such that the first metadata occupies both the first physical block and the last physical block of the first physical disruption region;

subsequent to performing the first write operation, receiving a third instruction to write a new quantum of application data to the logical volume, the third instruction specifying the first logical block within the logical volume to which the new quantum of application data is to be written;

converting the third instruction to write the new quantum of application data to the first logical block within the logical volume into a fourth instruction to write the new quantum of application data to a specified physical block within a second physical disruption region of the asymmetric memory component that is different from the first physical disruption region of the asymmetric memory component;

processing the fourth instruction to write the new quantum of application data to the specified physical block within the second physical disruption region of the asymmetric memory component;

in response to processing the fourth instruction to write the new quantum of application data to the specified physical block within the second physical disruption region of the asymmetric memory component, performing a second write operation that includes:
  generating second metadata that maps logic blocks within the logical volume to the specified physical block within the second physical disruption region to which the second write operation is directed, the second metadata indicating that the specified physical block within the second physical disruption region of the asymmetric memory component is valid,
  writing the new quantum of application data and the second metadata related to the second write operation to different physical blocks within the second physical disruption region of the asymmetric memory component such that the new quantum of application data and the second metadata related to the second write operation both are written to the same physical disruption region of the asymmetric memory component in an interleaved manner in which the second metadata occupies both the first physical block and the last physical block of the second physical disruption region while data from the first quantum of application data and the first metadata in different physical blocks within the first physical disruption region of the asymmetric memory is available for random access reading, and updating the first metadata stored in the first physical disruption region of the asymmetric memory component to indicate that the specified physical block within the first physical disruption region of the asymmetric memory component is invalid, determining that a volume information table for the logical volume needs to be recreated, and in response to the determination that the volume information table for the logical volume needs to be recreated, recreating the volume information table by:

accessing the first metadata from the first physical disruption region of the asymmetric memory component, accessing the second metadata from the second physical disruption region of the asymmetric memory component, determining that the specified physical block within the second physical disruption region of the asymmetric memory component stores a valid version of the first logical block within the logical volume based on processing:

the first metadata which indicates that the specified physical block within the first physical disruption region of the asymmetric memory component corresponds to the first logical block within the logical volume, but is invalid, and the second metadata which indicates that the specified physical block within the second physical disruption region of the asymmetric memory component corresponds to the first logical block within the logical volume and is valid, and based on the determination that the specified physical block within the second physical disruption region of the asymmetric memory component stores a valid version of the first logical block within the logical volume, configuring the recreated volume information table to map the first logical block within the logical volume to the specified physical block within the second physical disruption region of the asymmetric memory component.

3. The method of claim 2 wherein:
generating the first metadata related to the first write operation further includes determining a relative time at which the first write operation occurs; and
writing the first metadata related to the first write operation includes writing, to the different physical block within the first physical disruption region of the asymmetric memory component, metadata that specifies the relative time at which the first write operation was determined to occur.

4. The method of claim 3 wherein:
determining a relative time at which the first write operation occurs includes determining a physical date and time at which the first write operation occurs; and
writing the first metadata related to the first write operation includes writing, to the different physical block within the first physical disruption region of the asymmetric memory component, metadata that specifies the physical date and time at which the first write operation was determined to occur.

5. The method of claim 2 wherein:
generating the first metadata related to the first write operation further includes determining a number of times that the first physical block within the first physical disruption region of the asymmetric memory component has been erased; and
writing the first metadata related to the first write operation includes writing, to the different physical block within the first physical disruption region of the asymmetric memory component, metadata that specifies the number of times that the first physical block within the first physical disruption region of the asymmetric memory component has been erased.

6. The method of claim 2 wherein:
the logical volume is associated with a volume identifier;
the first logical block within the logical volume is associated with a volume offset that identifies the first logical block's offset within the logical volume;
receiving the first instruction to write the first quantum of application data to the first logical block within the logical volume includes receiving an instruction that specifies that the first quantum of application data is to be written to the first logical block within the logical volume by specifying the volume identifier of the logical volume and the volume offset of the first logical block; and
writing the first metadata related to the first write operation includes writing, to the different physical block within the first physical disruption region of the asymmetric memory component, the volume identifier and the volume offset.

7. The method of claim 2 wherein:
the memory storage system includes a volatile memory component that is different from the asymmetric memory component; and
the method further comprises:
maintaining, in the volatile memory component, the volume information table that maps logical blocks within the volume to corresponding physical blocks that store application data associated with the logical blocks to which they correspond, the physical blocks being located within physical disruption regions of the asymmetric memory component.

8. The method of claim 2 further comprising:
before processing the second instruction to write the first quantum of application data to the first physical block within the first physical disruption region of the asymmetric memory component:
receiving an instruction to create the logical volume, the instruction to create the logical volume specifying a name for the logical volume and a number of logical blocks to be included within the logical volume; and
in response to receiving the instruction to create the logical volume:
creating the logical volume,
creating a volume metadata structure, and
configuring the volume metadata structure including:
writing the name for the logical volume to the volume metadata structure,
writing the number of logical blocks included within the logical volume to the volume metadata structure, determining a relative time at which the logical volume is created, and writing the determined relative time at which the logical volume was created to the volume metadata structure.

9. The method of claim 8 further comprising:

receiving an instruction to extend the logical volume to include an additional number of logical blocks; and in response to receiving the instruction to extend the logical volume to include the additional number of logical blocks:

extending the logical volume to include the additional number of logical blocks, and updating the volume metadata structure to reflect that the logical volume has been extended to include the additional number of logical blocks.

10. The method of claim 2 further comprising reserving one or more physical blocks within the first physical disruption region of the asymmetric memory component exclusively for storing metadata related to other physical blocks within the first physical disruption region of the asymmetric memory component, wherein writing the first metadata related to the first write operation includes writing the first metadata related to the first write operation to one of the one or more physical blocks within the first physical disruption region of the asymmetric memory component that are reserved exclusively for storing metadata related to other physical blocks within the first physical disruption region of the asymmetric memory component.

11. The method of claim 10 wherein:

reserving one or more physical blocks within the first physical disruption region of the asymmetric memory component exclusively for storing metadata related to other physical blocks within the first physical disruption region of the asymmetric memory component includes reserving a third physical block and a fourth physical block within the first physical disruption region of the asymmetric memory component exclusively for storing metadata related to other physical blocks within the first physical disruption region of the asymmetric memory component; and writing the first metadata related to the first write operation to one of the one or more physical blocks within the first physical disruption region of the asymmetric memory component that are reserved exclusively for storing metadata related to other physical blocks within the first physical disruption region of the asymmetric memory component includes:

determining that metadata stored in the third physical block reserved exclusively for storing metadata reflects a present state of the first physical disruption region and that the fourth physical block reserved exclusively for storing metadata is available to be written to, copying metadata stored in the third physical block reserved exclusively for storing metadata, updating the metadata copied from the third physical block reserved exclusively for storing metadata to include the first metadata related to the first write operation, and writing the updated metadata to the fourth physical block reserved exclusively for storing metadata.

12. The method of claim 10 further comprising maintaining a log in the one or more physical blocks within the first physical disruption region of the asymmetric memory component that are reserved exclusively for storing metadata related to other physical blocks within the first physical disruption region of the asymmetric memory component, the log including metadata entries related to previous write operations that have been performed on other physical blocks within the first physical disruption region of the asymmetric memory component, wherein writing the first metadata related to the first write operation includes adding, to the log, a new metadata entry related to the first write operation.

13. The method of claim 12 wherein:

generating the first metadata related to the first write operation includes determining that performing the first write operation includes writing the first quantum of application data to the first physical block within the first physical disruption region of the asymmetric memory component; and adding, to the log, a new metadata entry related to the first write operation includes adding, to the log, a new metadata entry related to the first write operation that identifies the first physical block within the first physical disruption region of the asymmetric memory component as storing the first quantum of application data.

14. The method of claim 12 wherein:

adding, to the log, a new metadata entry related to the first write operation includes adding, to the log, a new metadata entry related to the first write operation that:

identifies the first physical block within the first physical disruption region of the asymmetric memory component as corresponding to the first logical block of the logical volume, and identifies the first physical block within the first physical disruption region of the asymmetric memory component as actually storing the first quantum of application data that the first instruction specified was to be written to the first logical block within the logical volume.

15. The method of claim 14 wherein:

generating the first metadata related to the first write operation further includes:

determining a relative time at which the first write operation occurs, and determining a number of times that the first physical block within the first physical disruption region of the asymmetric memory component has been erased; and adding, to the log, a new metadata entry related to the first write operation includes adding, to the log, a new metadata entry related to the first write operation that specifies:

the relative time at which the first write operation was determined to occur, and the number of times that the first physical block within the first physical disruption region of the asymmetric memory component has been erased.

16. The method of claim 12 wherein:

reserving one or more physical blocks within the first physical disruption region of the asymmetric memory component exclusively for storing metadata related to other physical blocks within the first physical disruption region of the asymmetric memory component includes reserving a third physical block and a fourth physical block within the first physical disruption region of the asymmetric memory component exclusively for storing metadata related to other physical blocks within the first physical disruption region of the asymmetric memory component;

maintaining a log in the one or more physical blocks within the first physical disruption region of the asymmetric memory component that are reserved exclusively for storing metadata related to other physical blocks within the first physical disruption region includes maintaining a log in the third physical block reserved exclusively for storing metadata; and
the method further comprises:
  detecting that a current size of the log maintained in the third physical block reserved exclusively for storing metadata exceeds a predetermined threshold value,
  in response to detecting that the current size of the log maintained in the third physical block reserved exclusively for storing metadata exceeds a predetermined threshold value:
    copying the log maintained in the third physical block reserved exclusively for storing metadata,
    collapsing the copied log by removing one or more outdated entries from the copied log,
    writing the collapsed log to the fourth physical block reserved exclusively for storing metadata, and
    erasing the third physical block reserved exclusively for storing metadata.

17. The method of claim 2 wherein:
the second instruction to write the first quantum of application data to the first physical block within the first physical disruption region of the asymmetric memory component is an instruction to update a first quantum of application data stored in a sector of the first physical block within the first physical disruption region of the asymmetric memory component, and
writing the first quantum of application data includes writing the updated first quantum of application data to the sector of the first physical block.

18. The method of claim 2 wherein:
the second instruction to write the first quantum of application data to the first physical block within the first physical disruption region of the asymmetric memory component is an instruction to update a first quantum of application data stored in a sector of the first physical block within the first physical disruption region of the asymmetric memory component, and
writing the first quantum of application data includes:
  copying application data from other sectors of the first physical block to another physical block, and
  writing the updated first quantum of application data to a sector of the other particular block.

19. The method of claim 2 wherein the first physical disruption region of the asymmetric memory component is a first bank of the asymmetric memory unit and the second physical disruption region of the asymmetric memory component is a second bank of the asymmetric memory unit that is different from the first bank of the asymmetric memory unit such that:
writing the first quantum of application data and the first metadata related to the first write operation to different physical blocks within the first physical disruption region of the asymmetric memory component includes writing the first quantum of application data and the first metadata related to the first write operation to different physical blocks within the first bank of the asymmetric memory component such that the first quantum of application data and the first metadata related to the first write operation both are written to the same bank of the asymmetric memory component; and
writing the new quantum of application data and the second metadata related to the second write operation to different physical blocks within the second physical disruption region of the asymmetric memory component includes writing the new quantum of application data and the second metadata related to the second write operation to different physical blocks within the second bank of the asymmetric memory component such that the new quantum of application data and the second metadata related to the second write operation both are written to the same bank of the asymmetric memory component.

20. A memory storage system for storing data for an electronic device, the memory storage system comprising:
a first physical disruption region of asymmetric memory within a memory module that includes:
  a first set of physical data blocks for storing application data,
  a first physical metadata block that is reserved for storing metadata that maps logic blocks utilized by a file system to the first set of physical data blocks within the first physical disruption region of asymmetric memory in which the application data has been stored, and
  a second physical metadata block that is reserved for storing a redundant copy of the metadata that identifies the application data stored in the first set of physical data blocks within the first physical disruption region of asymmetric memory, wherein the first physical disruption region of asymmetric memory is configured to enable write operations to individual physical data blocks within the first physical disruption region of asymmetric memory in which writing to an individual physical data block within the first physical disruption region of asymmetric memory affects the availability of other physical blocks within the first physical disruption region of asymmetric memory, and wherein the first set of physical data blocks are interleaved with the first and second physical metadata blocks such that the first and second physical metadata blocks occupy both the first physical block and the last physical block of the first physical disruption region;
a second physical disruption region of asymmetric memory within the memory module that includes:
  a second set of physical data blocks for storing application data,
  a third physical metadata block that is reserved for storing metadata that maps logic blocks utilized by the file system to the second set of physical data blocks within the second physical disruption region of asymmetric memory in which the application data has been stored, and
  a fourth physical metadata block that is reserved for storing a redundant copy of the metadata that identifies the application data stored in the second set of physical data blocks within the second physical disruption region of asymmetric memory, wherein the second physical disruption region of asymmetric memory is configured to enable write operations to individual physical data blocks within the second physical disruption region of asymmetric memory in which writing to an individual physical data block within the second physical disruption region of asymmetric memory affects the availability of other physical blocks within the second physical disruption region of asymmetric memory, and wherein the second set of physical data blocks are interleaved with the third and the fourth physical metadata blocks such that the third and the fourth physical metadata blocks occupy both the first physical block and the last physical block of the second physical disruption region; and a memory controller configured to (i) process memory-level random-access read operations to the first physical disruption region of asymmetric memory within the memory module during block-level write operations to the second physical disruption region of asymmetric memory within the memory module when a portion of the physical blocks in the first physical disruption region is being updated by virtue of the block-level write operations to the second physical disruption region and (ii) process memory-level random-access read operations to the second physical disruption region of asymmetric memory within the memory module during block-level write operations to the first physical disruption region of asymmetric memory within the memory module when a portion of the physical blocks in the second physical disruption region is being updated by virtue of the block-level write operations to the first physical disruption region, wherein the memory controller is configured to recreate a volume information table for a logical volume by:

accessing first metadata from the first physical metadata block, accessing second metadata from the third physical metadata block, reconciling one or more conflicts between the accessed first metadata and the access second metadata, and based on reconciliation of the one or more conflicts, configuring the recreated volume information table to map each logical block within the logical volume to a single physical data block within the asymmetric memory.

21. The memory storage system of claim 20 wherein:

the first physical metadata block is configured to maintain a first log for storing a first set of metadata entries that are related to write operations performed on individual physical data blocks of the first set of physical data blocks within the first physical disruption region of asymmetric memory and that identify individual physical data blocks of the first set of physical data blocks within the first physical disruption region of asymmetric memory as corresponding to individual logical blocks and storing application data associated with the individual logical blocks to which the individual physical data blocks of the first set of physical data blocks within the first physical disruption region of asymmetric memory are identified as corresponding; and the third physical metadata block is configured to maintain a second log for storing a second set of metadata entries that are related to write operations performed on individual physical data blocks of the second set of physical data blocks within the second physical disruption region of asymmetric memory and that identify individual physical data blocks of the second set of physical data blocks within the second physical disruption region of asymmetric memory as corresponding to individual logical blocks and storing application data associated with the individual logical blocks to which the individual physical data blocks of the second set of physical data blocks within the second physical disruption region of asymmetric memory are identified as corresponding.

22. The memory storage system of claim 20 wherein:

the first physical metadata block is configured to maintain a first log for storing a first set of metadata entries that are related to write operations performed on individual physical data blocks of the first set of physical data blocks within the first physical disruption region of asymmetric memory, that identify individual physical data blocks of the first set of physical data blocks within the first physical disruption region of asymmetric memory as corresponding to individual logical blocks and storing application data associated with the individual logical blocks to which the individual physical data blocks of the first set of physical data blocks within the first physical disruption region of asymmetric memory are identified as corresponding, and that specify relative times at which the application data associated with individual logical blocks was written to the individual physical data blocks of the first set of physical data blocks within the first physical disruption region of asymmetric memory; and the second physical metadata block is configured to maintain a second log for storing a second set of metadata entries that are related to write operations performed on individual physical data blocks of the second set of physical data blocks within the second physical disruption region of asymmetric memory, that identify individual physical data blocks of the second set of physical data blocks within the second physical disruption region of asymmetric memory as corresponding to individual logical blocks and storing application data associated with the individual logical blocks to which the individual physical data blocks of the second set of physical data blocks within the second physical disruption region of asymmetric memory are identified as corresponding, and that specify relative times at which the application data associated with individual logical blocks was written to the individual physical data blocks of the second set of physical data blocks within the second physical disruption region of asymmetric memory.

23. The memory storage system of claim 20 wherein:

one or more individual physical data blocks of the first set of physical data blocks within the first physical disruption region of asymmetric memory are configured to store data associated with individual logical blocks of the logical volume; and one or more individual physical data blocks of the second set of physical data blocks within the second physical disruption region of asymmetric memory are configured to store data associated with individual logical blocks of the logical volume.

24. The memory storage system of claim 23 wherein:

the first physical disruption region of asymmetric memory is a first bank of an asymmetric memory component; and the second physical disruption region of asymmetric memory is a second bank of the asymmetric memory component.

25. The memory storage system of claim 20 further comprising a volatile memory component that is different from the first physical disruption region of asymmetric memory and the second physical disruption region of asymmetric memory, the volatile memory component including the volume information table that is configured to map individual logical blocks of the logical volume to corresponding individual physical data blocks of the first and second sets of physical data blocks within the first and second physical disruption regions of asymmetric memory that store data associated with the individual logical blocks to which they correspond.

26. The memory storage system of claim 25 wherein the logical volume includes a number of logical blocks, the memory storage system further comprising a volume metadata structure that is configured to store metadata related to the logical volume, the metadata related to the logical volume including:
  a name for the logical volume;
  the number of logical blocks within the logical volume; and
  a relative time at which the logical volume was created.

* * * * *